US008264398B2

(12) United States Patent
Kamo

(10) Patent No.: US 8,264,398 B2
(45) Date of Patent: Sep. 11, 2012

(54) ONBOARD RADAR DEVICE AND PROGRAM OF CONTROLLING ONBOARD RADAR DEVICE

(75) Inventor: Hiroyuki Kamo, Yokohama (JP)

(73) Assignee: Honda Elesys Co., Ltd., Yokohama (JP)

( * ) Notice: Subject to any disclaimer, the term of this patent is extended or adjusted under 35 U.S.C. 154(b) by 150 days.

(21) Appl. No.: 12/773,539

(22) Filed: May 4, 2010

(65) Prior Publication Data

US 2011/0102238 A1    May 5, 2011

(30) Foreign Application Priority Data

Nov. 4, 2009    (JP) ............................... P2009-252654

(51) Int. Cl.
*G01S 13/00* (2006.01)
(52) U.S. Cl. ........................... 342/70; 342/175; 342/188
(58) Field of Classification Search ............... 342/22, 342/25 R, 25 A, 25 B, 25 C, 25 D, 25 E, 342/25 F, 26 R, 26 A, 26 B, 26 C, 26 D, 70–72, 342/175, 188

See application file for complete search history.

(56) References Cited

U.S. PATENT DOCUMENTS

| | | | | | |
|---|---|---|---|---|---|
| 3,049,703 | A | * | 8/1962 | Davis | 342/159 |
| 3,478,362 | A | * | 11/1969 | Ricardi et al. | 343/769 |
| 3,500,460 | A | * | 3/1970 | Jones et al. | 333/21 R |
| 3,568,190 | A | * | 3/1971 | Wong | 333/117 |
| 4,308,536 | A | * | 12/1981 | Sims et al. | 342/70 |
| 4,329,687 | A | * | 5/1982 | Kloevekorn et al. | 342/136 |
| 4,490,719 | A | * | 12/1984 | Botwin et al. | 342/64 |
| 4,821,039 | A | * | 4/1989 | Crane | 342/153 |
| 4,868,917 | A | * | 9/1989 | Woolcock | 342/26 B |
| 5,264,856 | A | * | 11/1993 | Thurlow | 342/188 |
| 5,337,058 | A | * | 8/1994 | Cross | 342/188 |
| 5,500,646 | A | * | 3/1996 | Zrnic | 342/188 |
| 6,061,013 | A | * | 5/2000 | Sauvageot et al. | 342/26 R |
| 6,127,985 | A | * | 10/2000 | Guler | 343/771 |
| 6,278,409 | B1 | * | 8/2001 | Zuta | 343/756 |
| 6,731,241 | B2 | * | 5/2004 | Park et al. | 342/361 |
| 6,741,208 | B1 | * | 5/2004 | West et al. | 342/374 |
| 7,167,123 | B2 | * | 1/2007 | Hausner et al. | 342/22 |
| 7,450,052 | B2 | * | 11/2008 | Hausner et al. | 342/22 |

(Continued)

FOREIGN PATENT DOCUMENTS

JP    07-084042    3/1995

(Continued)

OTHER PUBLICATIONS

JP Office Action dated Mar. 13, 2012, 6 pages.

*Primary Examiner* — Jack W Keith
*Assistant Examiner* — Peter Bythrow
(74) *Attorney, Agent, or Firm* — Arent Fox LLP

(57) ABSTRACT

An onboard radar apparatus includes a transmission wave generating unit configured to generate a transmission wave, a vertically polarized wave transmitting antenna configured to vertically polarize and transmit the transmission wave, a horizontally polarized wave transmitting antenna configured to horizontally polarize and transmit the transmission wave, a receiving antenna configured to receive a reflection wave, a switch control unit configured to perform a switching between the vertically polarized wave transmitting antenna and the horizontally polarized wave transmitting antenna, and a receiving unit configured to receive one of the reflection waves based on receiving levels of the reflection waves, which have been received by the receiving antenna before and after the switching is performed by the switch control unit.

18 Claims, 24 Drawing Sheets

EXAMPLE OF 2 POLARIZED WAVES × 2 POLARIZED WAVES
[POLARIZED WAVE SELECTING METHOD]

U.S. PATENT DOCUMENTS

| | | | |
|---|---|---|---|
| 7,498,970 B2 * | 3/2009 | Yoshida | 342/70 |
| 7,528,767 B2 * | 5/2009 | Walker | 342/174 |
| 7,592,948 B2 * | 9/2009 | Walker | 342/174 |
| 7,733,265 B2 * | 6/2010 | Margomenos et al. | 342/70 |
| 7,825,847 B2 * | 11/2010 | Fujimura | 342/25 R |
| 7,834,803 B2 * | 11/2010 | Weinstein | 342/70 |
| 8,085,181 B2 * | 12/2011 | Gekat | 342/26 R |
| 8,098,189 B1 * | 1/2012 | Woodell et al. | 342/26 R |
| 2004/0056791 A1 * | 3/2004 | Alford et al. | 342/26 |
| 2007/0013582 A1 * | 1/2007 | Kwon et al. | 342/188 |
| 2009/0102704 A1 * | 4/2009 | Fujimura | 342/25 A |
| 2009/0174596 A1 * | 7/2009 | Gekat | 342/26 R |
| 2009/0224964 A1 * | 9/2009 | Raney | 342/25 F |
| 2011/0102238 A1 * | 5/2011 | Kamo | 342/70 |

FOREIGN PATENT DOCUMENTS

| | | |
|---|---|---|
| JP | 2000-028714 | 1/2000 |
| JP | 2006-242468 | 9/2006 |
| JP | 2006-275840 A | 10/2006 |

* cited by examiner

TE INCIDENCE

TM INCIDENCE

FIG. 3

| | | $\theta 2=0$ (deg) | $0<\theta 2<\theta 2b$ | $\theta 2=\theta 2b$ | $\theta 2b<\theta 2<90$ (deg) | $\theta 2\fallingdotseq 90$ (deg) |
|---|---|---|---|---|---|---|
| TM INCIDENCE | REFLECTANCE | TM=TE | ⇒0 | NON-REFLECTION | ⇒1 | ≒ TOTAL REFLECTION |
| | REFLECTION PHASE | +π PHASE INVERSION | +π PHASE INVERSION | — | SAME PHASE | SAME PHASE |
| TE INCIDENCE | REFLECTANCE | TM=TE | ⇒1 | ⇒1 | ⇒1 | ≒ TOTAL REFLECTION |
| | REFLECTION PHASE | +π PHASE INVERSION | +π PHASE INVERSION | +π PHASE INVERSION | +π PHASE INVERSION | +π PHASE INVERSION |

$\theta 2b$ = BREWSTER'S ANGLE

EXAMPLE OF 2 POLARIZED WAVES × SINGLE POLARIZED WAVE
[POLARIZED WAVE SELECTING METHOD]

EXAMPLE OF 2 POLARIZED WAVES × 2 POLARIZED WAVES
[POLARIZED WAVE SELECTING METHOD]

EXAMPLE OF 2 POLARIZED WAVES × SINGLE POLARIZED WAVE
[POLARIZED WAVE SYNTHESIS METHOD]

EXAMPLE OF 2 POLARIZED WAVES × 2 POLARIZED WAVES
[POLARIZED WAVE SYNTHESIS METHOD]

EXAMPLE OF SINGLE POLARIZED WAVE × 2 POLARIZED WAVES
[POLARIZED WAVE SELECTING METHOD]

ONBOARD RADAR DEVICE AND PROGRAM OF CONTROLLING ONBOARD RADAR DEVICE

BACKGROUND OF THE PRESENT INVENTION

1. Field of the Present Invention

The present invention generally relates to an onboard radar device and a program of controlling the onboard radar device.

Priority is claimed on Japanese Patent Application No. 2009-252654, filed Nov. 4, 2009, the content of which is incorporated herein by reference.

2. Description of Related Art

A technique of launching an electromagnetic wave of a milli-wave (mm) band to measure the distance from vehicles or obstacles around a user's vehicle, the relative speed, or the like has been known as a onboard radar, which is disclosed in Japanese Unexamined Patent Application, First Publication, No. 2006-275840, for example.

FIG. 22 is a schematic diagram illustrating a ground propagation model to describe a propagation of an electromagnetic wave performed by the onboard radar in accordance with the conventional art. In FIG. 22, an electromagnetic wave launched from a transmitting antenna 10 of the onboard radar propagates on a route r1, is reflected from a reflection point 12 such as a front vehicle and an obstacle at a position of a distance R1 from the transmitting antenna 10, propagates on the route r1, and is input to a receiving antenna 11 disposed at a position substantially closer to the transmitting antenna 10 or used in common with the transmitting antenna 10. The onboard radar measures the distance to the reflection point 12 such as a front vehicle and an obstacle, and the relative speed by a phase difference of the received electromagnetic wave.

In the above-described onboard radar, actually, there is also a propagation route of reflecting from a reflection point 11 (ground surface) through a route r2 and following a route r3, in addition to the case where the electromagnetic wave propagates on the route r1, as shown in the terrestrial propagation model shown in FIG. 22. For this reason, electromagnetic waves propagating from a plurality of routes are synthesized at the reflection point 12, the synthesized wave reflected from the reflection point 12 propagates again on the route of propagating on the routes r3 and r2 in addition to the route r1, and the electromagnetic wave synthesized at least twice or more is input to the receiving antenna 11. The synthesized electromagnetic wave is input to the receiving antenna 11. The distance to the reflection point 11 is d1, the distance from the reflection point 11 to the reflection point 12 is d2, and the distance from the transmitting antenna 10 and the receiving antenna 11 to the reflection point 12 is R1. The height of the transmitting antenna 10 and the receiving antenna 11 is h1, the height of the reflection point 12 is h2, and generally, h1 is equal to h2. The incident angle of r2 and r3 with respect to the ground surface is θ2.

Hereinafter, attenuation characteristics of the electromagnetic wave between the antenna and the reflection point will be described using the terrestrial propagation model shown in FIG. 22. FIG. 23 is a diagram illustrating an example of calculation of free-space propagation attenuation and propagation attenuation including an indirect wave. Generally, an electromagnetic wave is exponentially attenuated according to the distance between transmission and reception R1. For example, an electromagnetic wave (direct wave) propagating on the route r1 is exponentially attenuated as R=R1 in the formula represented by the numerical expression (1), and has attenuation characteristics shown by the broken line in FIG. 23.

$$P_{free} = \frac{P_t G_t G_r \lambda^2 \sigma}{(4\pi)^3 R^4} \quad (1)$$

In the case of including an electromagnetic wave (indirect wave) propagating on the routes r2 and r3, an element of r4 (r2+r3=r4) is included in the formula represented by the numerical expression (2). As a result, the attenuation characteristics fluctuate up and down, "canceling" parts and "strengthening" parts like faulting ridge portions and valley portions appear along a trace (broken line) represented by the numerical expression (1), and become the attenuation characteristics shown by the solid line in FIG. 23.

$$E_r = [e^{-j\beta r1}(1+R_1 D_{T(\theta_1)} e^{-j\beta((r2+r3)-r1)})][R_2 e^{-j\beta r1}(1+R_1 D_{R(\theta_1)} e^{-j\beta((r2+r3)-r1)})] = [e^{-j\beta r1}(1+R_1 D_{T(\theta_1)} e^{-j\beta(r4-r1)})][R_2 e^{-j\beta r1}(1+R_1 D_{R(\theta_1)} e^{-\beta(r4-r1)})]$$

where $$r_4 = r_2 + r_3 \quad (2)$$

The direct wave that is the electromagnetic wave transmitted through the route r1 and the indirect wave that is the electromagnetic wave transmitted through the route r2 and the route r3 have different propagating distances, and cause a phase difference and an amplitude difference at a destination that is the receiving antenna 11 of the onboard radar. A phenomenon of deteriorating the reception signal by the synthesis of the direct wave and the reflection wave in which the phase difference and the amplitude difference occur is called road surface multi-path fading.

In the milli-wave band onboard radar, road surface multi-path fading is one of the important factors causing measurement disturbance. When considering road surface multi-path fading in the onboard radar, the terrestrial propagation model shown in FIG. 22 is used. Hereinafter, in the onboard radar, the influence of road surface multi-path fading will be considered with reference to the power attenuation characteristics observed (with respect to the propagation route r1) by the radar or the receiving antenna 11.

In road surface multi-path fading of the milli-wave band onboard radar, there are several restrictive conditions different from those of the general communication. That is:

a) the transmission and receiving antennas are installed at relatively very low positions in height with respect to the distance between transmission and reception, b) in the detection range (several tens of m to one hundred and several tens of m), the incident angle θ2 (see FIG. 22) with respect to the ground surface is substantially 80° or more.

The restrictive conditions are large factors affected by road surface multi-path fading.

FIG. 24 is a concept diagram illustrating the relation of power attenuation with respect to the heights of the antenna and the reflection point and the distance between transmission and reception in the terrestrial propagation model. In this simulation for calculation, the road surface is a road surface formed of concrete or the like, and the reflection wall is a completely flat conductor.

As shown in FIG. 24, when the height h1 of the antenna and the height h2 of the reflection point are hA, the attenuation characteristics are as shown by the broken line. When the height h1 of the antenna and the height h2 of the reflection point are hB used for the onboard radar, the attenuation characteristics are as shown by the solid line. That is, when the heights h1 and h2 of the antenna and the reflection point are very low hB used for the onboard radar with respect to the distance between transmission and reception, the difference in propagation distance between both routes of the direct wave and the indirect wave is small as compared with the case of hA. Accordingly, very wide "strengthening" parts and "canceling" parts occur as described above. As the distance between transmission and reception R1 gets larger (farther), the power attenuation of the "canceling" parts gets larger and the span tends to be wider.

More specifically, at parts surrounded by ovals, the power attenuation is less than the minimum detection precision shown by the chain double dashed line, and it is impossible to detect the reception electric wave. Particularly, at a position where the distance between transmission and reception is about RA, the width is a wide span and thus the detection is impossible.

FIG. 25 is a schematic diagram illustrating relation of the incident angle θ2 and the reflection coefficient with respect to the heights of the antenna and the reflection point and the distance between transmission and reception in the terrestrial propagation model. As illustrated in FIG. 25, the longer the distance R1 becomes, the incident angle θ2 becomes large and the reflection coefficient of the ground becomes large and the reflection becomes a total reflection approximately.

That is, when the heights h1 and h2 of the antenna and the reflection point are hB used for the onboard radar, the incident angle θ2 and reflection coefficient rapidly get larger as the distance between transmission and reception gets larger as compared with the case of hA. Accordingly, when the distance between transmission and reception R1 is larger than RB, the incident electric wave is reflected substantially without loss. For this reason, at the "canceling" parts (valley parts) shown in FIG. 24, it can be seen that the reception power tends to be substantially 0 (mW). That is, the onboard radar in which the heights h1 and h2 of the antenna and the reflection point are relatively low are greatly affected by road surface multi-path fading.

As described above, in the onboard radar, parts in which the chance of causing measurement disturbance is high are the "canceling" positions corresponding to the valley portions of the power attenuation characteristics. When the reception power value is less than the minimum detection precision of the onboard radar, the reflection wave signal cannot be detected. Thus, there is a problem that the object (vehicles, obstacles, etc.) at the corresponding distance cannot be detected. In addition, under the conditions for using the onboard radar, in the distance between transmission and reception of several tens of m to one hundred and several tens of m requiring the detection, the amplitude span is wide, and the amount of decrease in level is large. Accordingly, this influence is a very important problem in the onboard radar.

SUMMARY

The present invention provides an onboard radar apparatus and a program capable of suppressing the influence caused by road surface multi-path fading to drastically reduce the measurement disturbance caused thereby.

An onboard radar apparatus may include a transmission wave generating unit configured to generate a transmission wave, a vertically polarized wave transmitting antenna configured to vertically polarize and transmit the transmission wave, a horizontally polarized wave transmitting antenna configured to horizontally polarize and transmit the transmission wave, a receiving antenna configured to receive a reflection wave reflected from an object, a switch control unit configured to perform a switching between the vertically polarized wave transmitting antenna and the horizontally polarized wave transmitting antenna, the switch control unit controlling a supply of the transmission wave, which has been generated by the transmission wave generating unit, to the switched one of the vertically polarized wave transmitting antenna and the horizontally polarized wave transmitting antenna, so as to alternately transmit the transmission wave that is vertically polarized and the transmission wave that is horizontally polarized, and a receiving unit configured to receive one of the reflection wave corresponding to the transmission wave that is vertically polarized and the reflection wave corresponding to the transmission wave that is horizontally polarized as a reception signal, based on receiving levels of the reflection waves, which have been received by the receiving antenna before and after the switching is performed by the switch control unit.

The onboard radar apparatus may include a storage unit configured to store the reception signal, which has been received by the receiving unit, every time the switching between the vertically polarized wave transmitting antenna and the horizontally polarized wave transmitting antenna is performed. The receiving unit may compare the reception signal stored in the storage unit with the reception signal, which has been received by the receiving antenna after the switching between the vertically polarized wave transmitting antenna and the horizontally polarized wave transmitting antenna is performed by the switch control unit, so as to receive the reception signal with a high receiving level.

When it is not detected that the reflection wave is received by the receiving antenna, the switch control unit may perform the switching between the vertically polarized wave transmitting antenna and the horizontally polarized wave transmitting antenna. The receiving unit may receive the reflection wave, which has been received by the receiving antenna after the switching performed by the switch control unit, as the reception signal.

The receiving antenna may receive both a vertically polarized reflection wave reflected from the object and a horizontally polarized reflection wave reflected from the object.

The receiving antenna may be an obliquely polarized wave receiving antenna that receives an obliquely polarized reflection wave reflected from the object.

The receiving antenna may be a circularly polarized wave receiving antenna that receives a circularly polarized reflection wave reflected from the object.

The receiving antenna may include a vertically polarized wave receiving antenna configured to receive a vertically polarized reflection wave reflected from the object, and a horizontally polarized wave receiving antenna configured to receive a horizontally polarized reflection wave reflected from the object. The switch control unit may perform the switching between the vertically polarized wave receiving antenna and the horizontally polarized wave receiving antenna by synchronizing with the switching between the vertically polarized wave transmitting antenna and the horizontally polarized wave transmitting antenna.

An onboard radar apparatus may include a transmission wave generating unit configured to generate a transmission wave, a distribution unit configured to distribute the transmission wave, which has been output from the transmission wave generating unit, a vertically polarized wave transmitting antenna configured to vertically polarize and transmit the transmission wave, which has been output from the transmission wave generating unit, a horizontally polarized wave transmitting antenna configured to horizontally polarize and transmit the transmission wave, which has been output from the transmission wave generating unit, a receiving antenna configured to receive a reflection wave reflected from an object, and a receiving unit configured to receive the reflection wave, which has been received by the receiving antenna and corresponding to the transmission wave that is vertically polarized, and the reflection wave, which has been received by the receiving antenna and corresponding to the transmission wave that is horizontally polarized, as a reception signal.

The receiving antenna may receive both the vertically polarized reflection wave reflected from the object and the horizontally polarized reflection wave reflected from the object.

The receiving antenna may be an obliquely polarized wave receiving antenna that receives an obliquely polarized reflection wave reflected from the object.

The receiving antenna may be a circularly polarized wave receiving antenna that receives a circularly polarized reflection wave reflected from the object.

The receiving antenna may include a vertically polarized wave receiving antenna configured to receive a vertically polarized reflection wave reflected from the object, and a horizontally polarized wave receiving antenna configured to receive a horizontally polarized reflection wave reflected from the object. The receiving unit may include a synthesis unit configured to synthesize the vertically polarized reflection wave, which has been received by the vertically polarized wave receiving antenna, and the horizontally polarized reflection wave, which has been received by the horizontally polarized wave receiving antenna.

An onboard radar apparatus may include a transmission wave generating unit configured to generate a transmission wave, a transmitting antenna configured to polarize and transmit the transmission wave, a vertically polarized wave receiving antenna configured to receive a vertically polarized reflection wave reflected from an object, a horizontally polarized wave receiving antenna configured to receive a horizontally polarized reflection wave reflected from the object, a switch control unit configured to perform a switching between the vertically polarized wave receiving antenna and the horizontally polarized wave receiving antenna so as to alternately receive the vertically polarized reflection wave reflected from the object and the horizontally polarized reflection wave reflected from the object, and a receiving unit configured to receive one of the vertically polarized reflection wave, which has been received by the vertically polarized wave receiving antenna, and the horizontally polarized reflection wave, which has been received by the horizontally polarized wave receiving antenna, as a reception signal, before and after the switching performed by the switch control unit, based on a receiving level of one of the vertically polarized reflection wave, which has been received by the vertically polarized wave receiving antenna, and the horizontally polarized reflection wave, which has been received by the horizontally polarized wave receiving antenna.

The onboard radar apparatus may include a storage unit configured to store the reception signal, which has been received by the receiving unit, every time the switching between the vertically polarized wave receiving antenna and the horizontally polarized wave receiving antenna is performed. The receiving unit may compare the reception signal stored in the storage unit with the reception signal, which has been received by one of the vertically polarized wave receiving antenna and the horizontally polarized wave receiving antenna after the switching between the vertically polarized wave receiving antenna and the horizontally polarized wave receiving antenna is performed by the switch control unit, so as to receive the reception signal with a high receiving level.

When it is not detected that the reflection wave is received by at least one of the vertically polarized wave receiving antenna and the horizontally polarized wave receiving antenna, the switch control unit may perform the switching between the vertically polarized wave receiving antenna and the horizontally polarized wave receiving antenna. The receiving unit may receive one of the vertically polarized reflection wave, which has been received by the vertically polarized wave receiving antenna, and the horizontally polarized reflection wave, which has been received by the horizontally polarized wave receiving antenna, as the reception signal after the switching is performed by the switch control unit.

The transmitting antenna may transmit both the transmission wave that is vertically polarized and the transmission wave that is horizontally polarized.

The transmitting antenna may be an obliquely polarized wave transmitting antenna that obliquely polarizes and transmits the transmission wave.

The transmitting antenna may be a circularly polarized wave transmitting antenna that circularly polarizes and transmits the transmission wave.

An onboard radar apparatus may include a transmission wave generating unit configured to generate a transmission wave, a transmitting antenna configured to polarize and transmits the transmission wave, a vertically polarized wave receiving antenna configured to receive a vertically polarized reflection wave reflected from an object, a horizontally polarized wave receiving antenna configured to receive a horizontally polarized reflection wave reflected from the object, and a receiving unit configured to synthesize and receive the vertically polarized reflection wave, which has been received by the vertically polarized wave receiving antenna, and the horizontally polarized reflection wave, which has been received by the horizontally polarized wave receiving antenna, as a reception signal.

The transmitting antenna may transmit both the transmission wave that is vertically polarized and the transmission wave that is horizontally polarized.

The transmitting antenna may be an obliquely polarized wave transmitting antenna that obliquely polarizes and transmits the transmission wave.

The transmitting antenna may be a circularly polarized wave transmitting antenna that circularly polarizes and transmits the transmission wave.

A program may be executed by a computer controlling operations of an onboard radar apparatus, to perform functions. The functions may include a transmission wave generating function of generating a transmission wave, a vertically polarized wave transmission function of vertically polarizing and transmitting the transmission wave from a vertically polarized wave transmitting antenna, a horizontally polarized wave transmission function of horizontally polarizing and transmitting the transmission wave from a horizontally polarized wave transmitting antenna, a first reception function of receiving a reflection wave reflected from an object, a switch control function of switching between the vertically polarized wave transmitting antenna and the horizontally polarized wave transmitting antenna and controlling a supply of the transmission wave, which has been generated by the transmission wave generating function, to the switched one of the transmission wave that is vertically polarized and the transmission wave that is horizontally polarized, and a second reception function of receiving one of the reflection wave corresponding to the transmission wave that is vertically polarized and the reflection wave corresponding to the transmission wave that is horizontally polarized as a reception signal, based on receiving levels of the reflection waves, which have been received by the receiving antenna before and after the switching is performed by the switch control function.

A program may be executed by a computer controlling operations of an onboard radar apparatus, to perform functions. The functions may include a transmission wave generating function of generating a transmission wave, a distribution function of distributing the transmission wave, a vertically polarized wave transmission function of vertically polarizing and transmitting the transmission wave, which has been distributed by the distribution function, from a vertically polarized wave transmitting antenna, a horizontally polarized wave transmission function of horizontally polarizing and transmitting the transmission wave, which has been distributed by the distribution function, from a horizontally polarized wave transmitting antenna, a first reception function of receiving a reflection wave, which has been reflected from an object, by a receiving antenna, and a second reception function of receiving the reflection wave, which has been received by the first reception function and corresponding to the vertically polarized transmission wave, and the reflection wave, which has been received by the first reception function and corresponding to the horizontally polarized transmission wave, as reception signals.

A program may be executed by a computer controlling operations of an onboard radar apparatus, to perform functions. The functions may include a transmission wave generating function of generating a transmission wave, a polarized wave transmission function of polarizing and transmitting the transmission wave from a transmitting antenna, a vertically polarized wave reception function of receiving a vertically polarized reflection wave, which has been reflected from an object, by a vertically polarized wave receiving antenna, a horizontally polarized wave reception function of receiving a horizontally polarized reflection wave, which has been reflected from the object, by a horizontally polarized wave receiving antenna, a switch control function of switching between the vertically polarized wave receiving antenna and the horizontally polarized wave receiving antenna, so as to alternately receive the reflection waves, which have been reflected from the object, and a reception function of receiving one of the reflection waves as a reception signal, based on receiving levels of the reflection waves, which have been received by one of the vertically polarized wave receiving antenna and the horizontally polarized wave receiving antenna before and after the switching is performed by the switch control function.

A program may be executed by a computer controlling operations of an onboard radar apparatus, to perform functions. The functions may include a transmission wave generating function of generating a transmission wave, a polarized wave transmission function of polarizing and transmitting the transmission wave from a transmitting antenna, a vertically polarized wave reception function of receiving a vertically polarized reflection wave, which has been reflected from an object, by a vertically polarized wave receiving antenna, a horizontally polarized wave reception function of receiving a horizontally polarized reflection wave, which has been reflected from the object, by a horizontally polarized wave receiving antenna, and a reception function of synthesizing and receiving the reflection wave, which has been received by the vertically polarized wave receiving antenna and corresponding to the polarized transmission wave, and the reflection wave, which has been received by the horizontally polarized wave receiving antenna and corresponding to the polarized transmission wave, as a reception signal.

In accordance with the present invention, it is possible to suppress the influence caused by road surface multi-path fading, and to drastically reduce the measurement disturbance caused thereby.

BRIEF DESCRIPTION OF THE DRAWINGS

The above features and advantages of the present invention will be more apparent from the following description of certain preferred embodiments taken in conjunction with the accompanying drawings.

FIG. 3 is a diagram illustrating, as a list, variation in reflectance and reflection phase (phase of reflection wave) of a vertically polarized wave (TM) and a horizontally polarized wave (TE) with respect to the incident angle.

DETAILED DESCRIPTION OF THE PREFERRED EMBODIMENTS

The present invention will be now described herein with reference to illustrative embodiments. Those skilled in the art will recognize that many alternative embodiments can be accomplished using the teaching of the present invention and that the present invention is not limited to the embodiments illustrated for explanatory purpose.

A. Principle of Invention

A principle of the present invention will be described.

Under conditions when an onboard radar will be used, almost all road surface materials are formed of dielectrics such as asphalt and concrete. Reflection of an electromagnetic wave occurring on the surface of the dielectric has characteristics in which the reflection loss and the phase are different in accordance with the incident angle θ2 and an electric field direction (TM=Transverse Magnetic: Vertically Polarized Wave, TE=Transverse Electric: Horizontally Polarized Wave). In the present invention, such different characteristics are used.

Figure 1B:
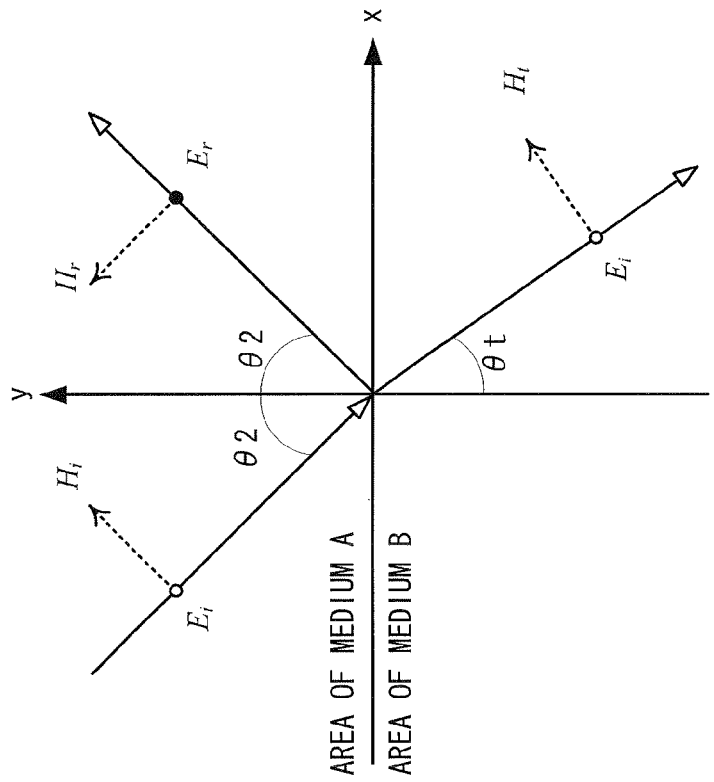
FIG. 1B is a schematic diagram illustrating reflection characteristics and transmittance characteristics of an electromagnetic wave on a face of a dielectric.
Figure 1A:
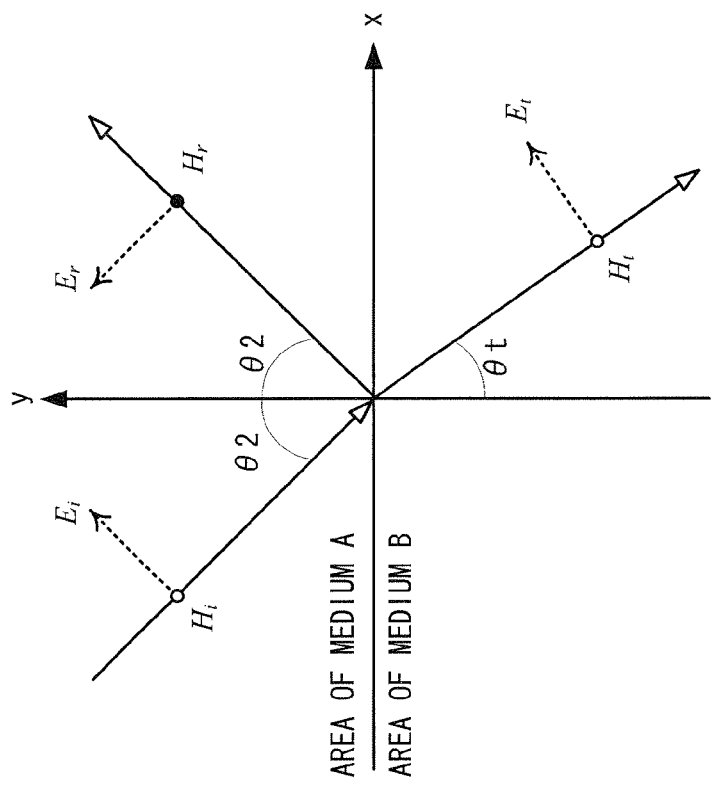
FIG. 1A is a schematic diagram illustrating reflection characteristics and transmittance characteristics of an electromagnetic wave on a face of a dielectric.

FIG. 1A and FIG. 1B are schematic diagrams illustrating reflection characteristics and refraction characteristics of an electromagnetic wave occurring on a surface of a dielectric. In FIG. 1A and FIG. 1B, the x-axis denotes the boundary of a medium A and a medium B. The medium A corresponds to the air, and the medium B corresponds to the dielectric as the road surface.

The vertically polarized wave (TM) is an electromagnetic wave, an electric field direction of which is vertical with respect to the road surface. In this case, as shown in FIG. 1A, an electromagnetic wave input to the medium B at the incident angle θ2 is reflected at the same reflection angle θ2 as the incident angle θ2 and is transmitted through the medium B at a transmission angle θt. The horizontally polarized wave (TE) is an electromagnetic wave, an electric field direction of which is horizontal with respect to the road surface. In this case, as shown in FIG. 1B, an electromagnetic wave input to the medium B at the incident angle θ2 is reflected at the same reflection angle θ2 as the incident angle θ2 and is transmitted through the medium B at a transmittance angle θt.

Figure 2:
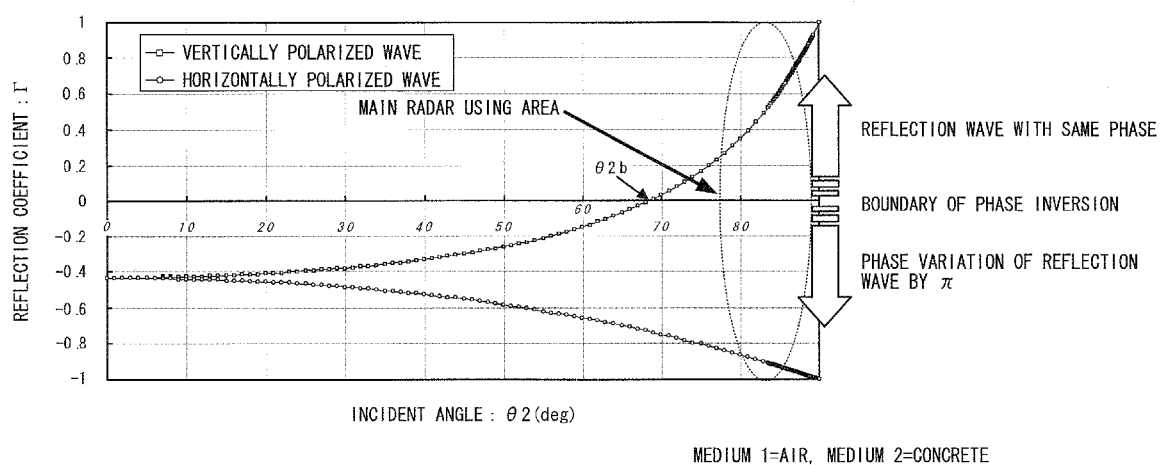
FIG. 2 is a schematic diagram illustrating reflection characteristics of a vertically polarized wave (TM) and a horizontally polarized wave (TE), as a variation in the reflection coefficient with respect to the incident angle.

FIG. 2 is a schematic diagram illustrating the reflection characteristics of the vertically polarized wave (TM) and the horizontally polarized wave (TE) as variations in the reflection coefficient with respect to the incident angle. The vertical axis denotes a reflection coefficient Γ, and the horizontal axis denotes the incident angle θ2. In the case of the vertical polarized wave (TM), as the incident angle θ2 increases, the reflection coefficient Γ positively increases. In the case of the horizontal polarized wave (TE), as the incident angle θ2 increases, the reflection coefficient Γ negatively increases. The phase inversion occurs in the reflection wave at the boundary of reflection coefficient Γ=0. In FIG. 2, the area where the incident angle θ2 surrounded by the oval of the broken line is 80° to 90° is the area used for the onboard radar.

FIG. 3 is a diagram illustrating, as a list, variation in reflectance and reflection phase (phase of reflection wave) of a vertically polarized wave (TM) and a horizontally polarized wave (TE) with respect to the incident angle. When the incident angle θ2 is 0°, the reflectances of the vertically polarized wave (TM) and the horizontal polarized wave (TE) are the same, and the phase inversion occurs in the reflection phases of the vertically polarized wave (TM) and the horizontally polarized wave (TE) by π.

When the incident angle θ2 is larger than 0° and smaller than θ2b (smaller than ≅70°, strictly, the incident angle when the reflection coefficient is 0), the reflectance of the vertically polarized wave (TM) goes toward 0, and the reflectance of the horizontally polarized wave (TE) goes toward −1. In this case, the phase inversion occurs in both reflection phases by π.

Similarly, when the incident angle θ2 is θ2b (smaller than ≅70°, strictly, the incident angle when the reflection coefficient is 0), there is no reflection in the reflectance of the vertically polarized wave (TM), and the reflectance of the horizontally polarized wave (TE) goes toward −1. In this case, since the reflection coefficient of the horizontally polarized wave (TM) is 0, there is no reflection wave. Also, the phase inversion occurs also by π in the reflection phase of the horizontally polarized wave (TE).

When the incident angle θ2 is larger than θ2b (smaller than ≅70°, strictly, the incident angle when the reflection coefficient is 0) and smaller than 90°, the reflectance of the vertically polarized wave (TM) goes toward 1, and the reflectance of the horizontally polarized wave (TE) goes toward −1. In this case, since the reflection phase of the vertically polarized wave (TM) is over the boundary of the reflection coefficient Γ=0, the reflection phase becomes the same phase, and the phase in the reflection phase of the horizontally polarized wave (TE) is inverted by π.

In the case of the incident angle $\theta 2 \cong 90°$, the reflectances of the vertically polarized wave (TM) and the horizontally polarized wave (TE) can approximate a substantially total reflection, the reflection phase of the vertically polarized wave (TM) becomes the same phase, and the phase in the reflection phase of the horizontally polarized wave (TE) is inverted by $\pi$.

That is, when the incident angle $\theta 2$ is up to $\theta 2b$ (smaller than $\cong 70°$, strictly, the incident angle when the reflection coefficient is 0), each phase in both reflection waves of the vertically polarized wave (TM) and the horizontally polarized wave (TE) shifts by $\pi$. From the vicinity over $\theta 2$ ($\cong 70°$), the phase in the reflection wave of the horizontally polarized wave (TE) shifts by $\pi$, but the reflection wave of the vertically polarized wave (TM) becomes the same phase. That is, the phases of the reflection waves of the vertically polarized wave (TM) and the horizontally polarized wave (TE) are different in the area (area where the incident angle $\theta 2$ is in the range of 80° to 90°) used for the onboard radar.

Figure 4:
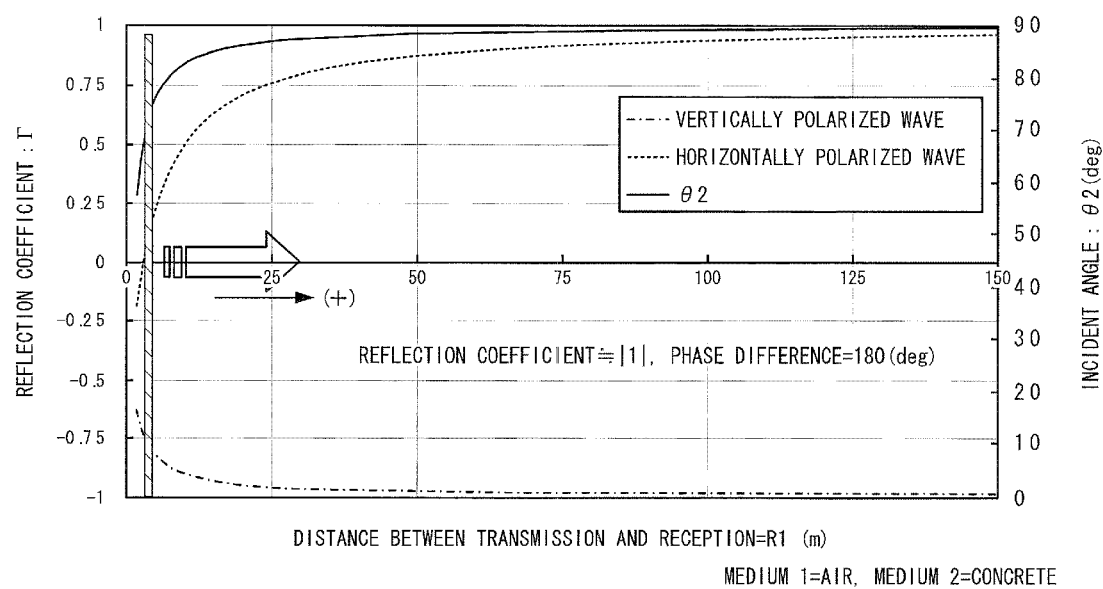
FIG. 4 is a schematic diagram illustrating a reflection coefficient of a road surface under a circumstance of a milli-wave band onboard radar.

FIG. 4 is a schematic diagram illustrating the reflection coefficient of the road surface under the circumstance of the milli-wave band onboard radar. FIG. 4 shows the incident angle $\theta 2$ of the indirect wave with respect to the propagation distance of the direct wave, and reflection coefficients of the horizontally polarized wave (TE) and the vertically polarized wave (TM). A detection range of the milli-wave band onboard radar detecting the front vehicle and the rear vehicle is a range of several tens of m to one hundred and several tens of m. The general onboard radar or the antenna thereof is installed at a front or rear end substantially at a height of several tens of cm.

Figure 22:
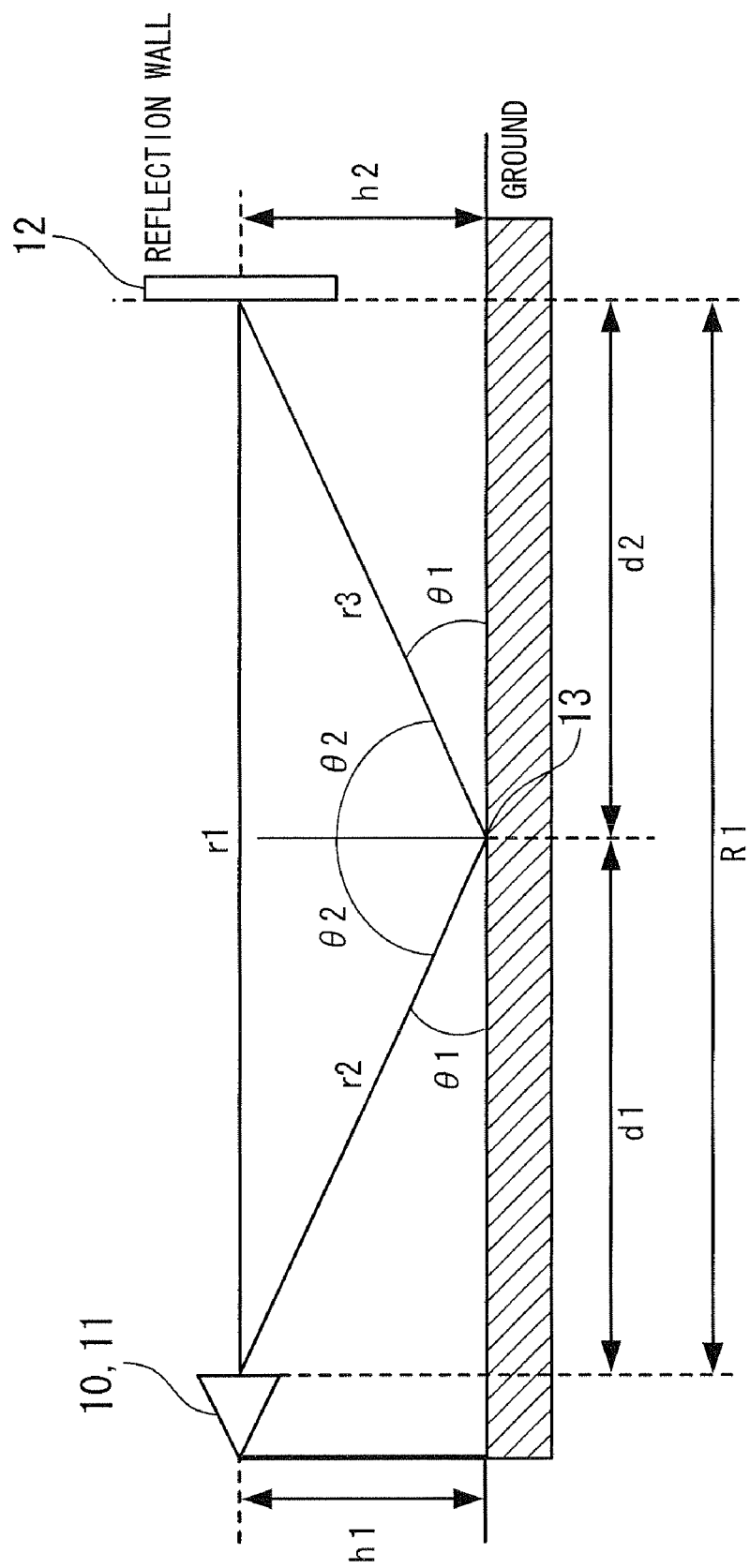
FIG. 22 is a schematic diagram illustrating a ground propagation model to describe a propagation of an electromagnetic wave performed by the onboard radar in accordance with the conventional art.
Figure 23:
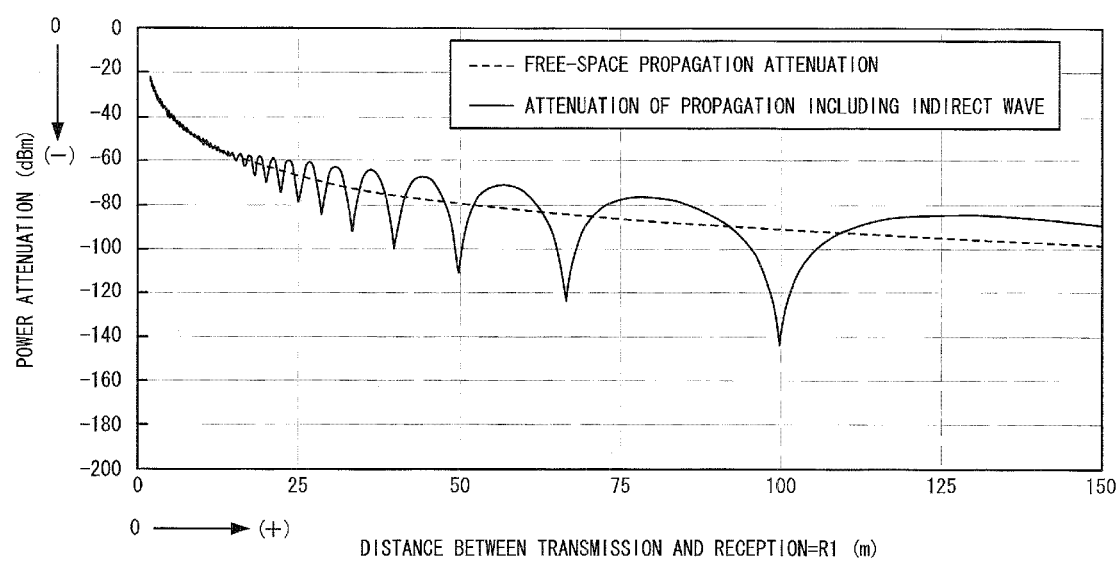
FIG. 23 is a diagram illustrating an example of calculation of free-space propagation attenuation and propagation attenuation including an indirect wave.
Figure 24:
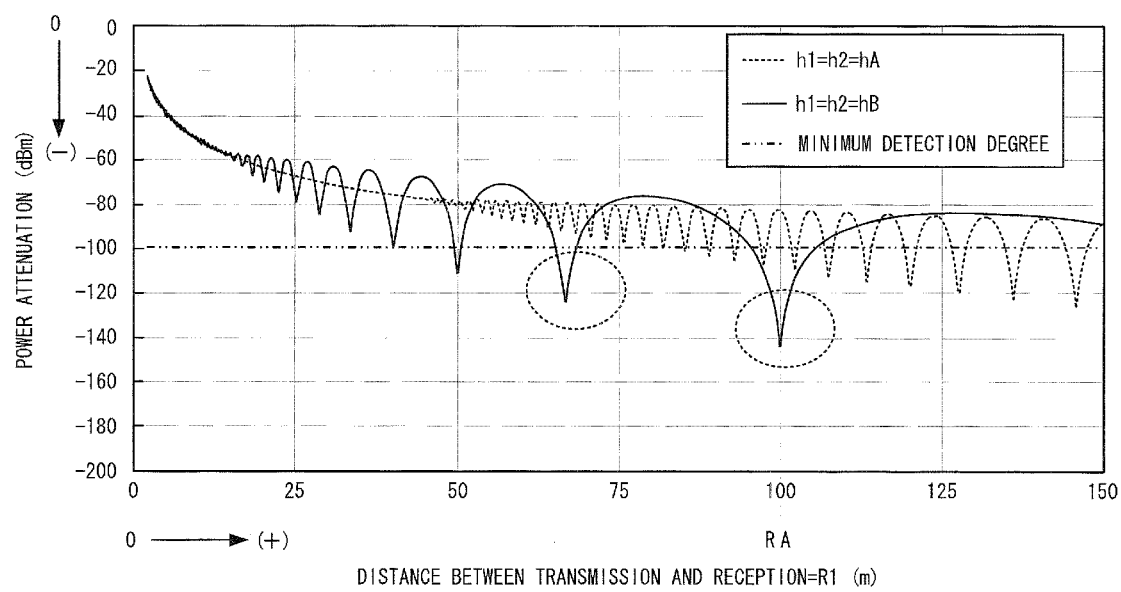
FIG. 24 is a schematic diagram illustrating relation of power attenuation with respect to heights of an antenna and a reflection point and the distance between transmission and reception in a ground propagation model.
Figure 25:
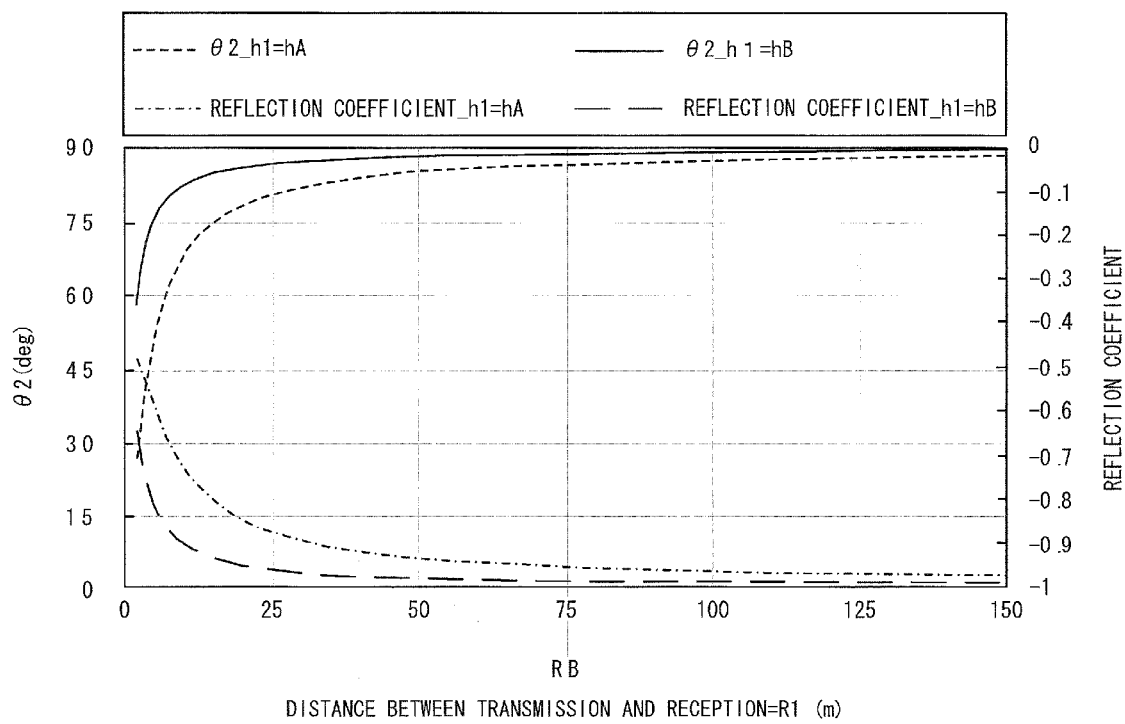
FIG. 25 is a schematic diagram illustrating relation of the incident angle θ2 and a reflection coefficient with respect to heights of an antenna and a reflection point and the distance between transmission and reception in a ground propagation model.

When a road surface incident angle of the indirect wave in the range of using the onboard radar is calculated by applying this condition, the road surface incident angle falls substantially within the range of the incident angle $\theta 2 > 80°$. That is, as shown in FIG. 4, a reflection coefficient in this condition may be considered as a reflection coefficient at the incident angle $\theta 2 \cong 90°$. Accordingly, the reflectance is substantially equivalent to those of both polarized waves, and the reflection wave in which the phase is different by $\pi$ reaches a wave synthesis point (the receiving antenna 11 shown in FIG. 22).

Figure 5:
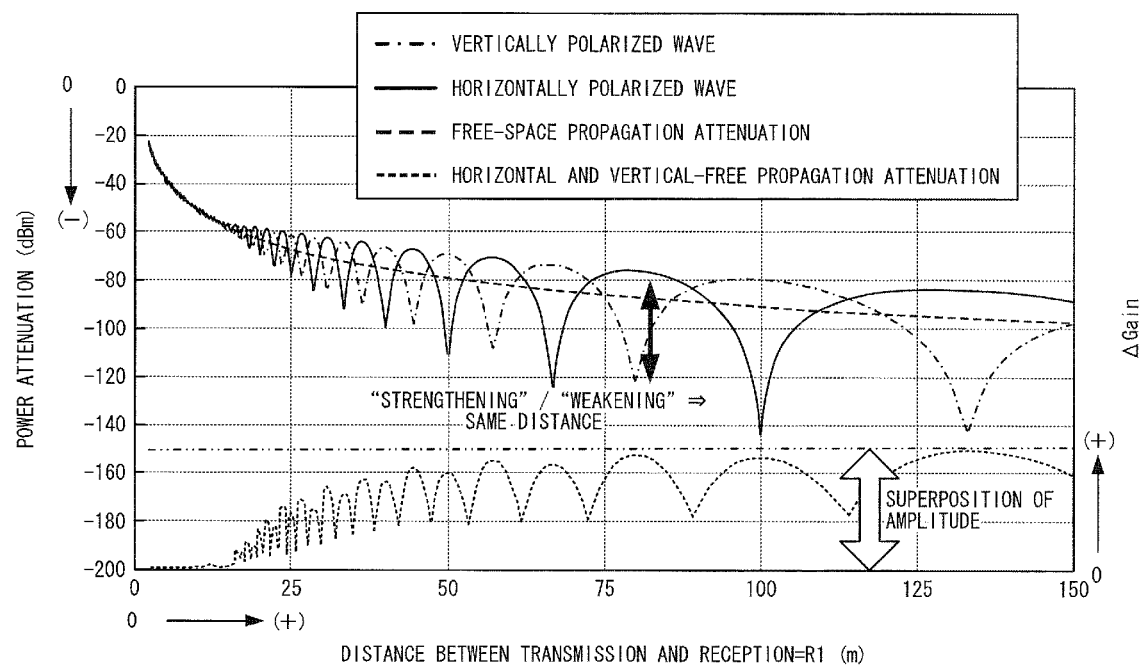
FIG. 5 is a schematic diagram illustrating complement of road surface multi-path fading caused by difference of reflection characteristics of an electric field direction (polarized wave).

FIG. 5 is a schematic diagram illustrating a complement of road surface multi-path fading caused by a difference of reflection characteristics of an electric field direction (polarized wave). In the ground propagation model, the power attenuation characteristics of the direct wave with respect to the propagation distance are calculated by applying the circumstances (road surface: concrete, height h1 of onboard radar (antenna), height h2 of reflection wall (object): several tens of cm) of using the milli-wave band onboard radar, when the vertically polarized wave (TM) and the horizontally polarized wave (TE) are input and propagate.

FIG. 5 shows power attenuation (chain line) at the wave synthesis point (the receiving antenna 11 shown in FIG. 22) when the vertically polarized wave (TM) propagates, power attenuation (solid line) at the wave synthesis point (the receiving antenna 11 shown in FIG. 22) when the horizontally polarized wave (TE) propagates, and power attenuation (broken line) at the wave synthesis point (the receiving antenna 11 shown in FIG. 22) when the direct wave propagates.

The amplitudes of the indirect waves of the vertically polarized wave (TM) and the horizontally polarized wave (TE) are substantially equivalent as described above, and the phase difference between the indirect waves of the vertically polarized wave (TM) and the horizontally polarized wave (TE) is $\pi$. Accordingly, the distance at which the maximum value of both "strengthening" parts is observed coincides with the distance at which the minimum value of both "canceling" parts is observed, and the power difference between the maximum value of both "strengthening" parts and the free-space propagation attenuation is substantially regularly amplified.

Using this relation, the power "weakening" parts (parts where measurement disturbance occurs) are improved, and the power "strengthening" parts are selected or synthesized (superposed twice). As for the free-space propagation loss, as shown by the dotted line at the lower part of FIG. 5, the improvement (increase) of the gain $\Delta$Gain can be seen, the influence caused by road surface multi-path fading is reduced, and can be expected to improve reception sensitivity.

B. First Preferred Embodiment

Next, a first preferred embodiment of the present invention will be described.

In the first preferred embodiment, as described above, the polarized wave selection method of selecting the power "strengthening" parts of the indirect waves of the vertically polarized wave (TM) and the horizontal polarized wave (TE) is employed. An onboard radar in accordance with the first preferred embodiment is provided with two transmitting antennas for polarized waves (vertically polarized wave and horizontally polarized wave) on the transmission side, and is provided with a receiving antenna capable of receiving both polarized waves (vertically polarized wave and horizontally polarized wave) on the receiving side. The onboard radar alternately transmits transmission signals of two polarized waves (vertically polarized wave or horizontally polarized wave) on the transmission side, and employs a reception signal of the polarized wave (vertically polarized wave or horizontally polarized wave) with a high receiving level on the receiving side. Hereinafter, this is referred to as a polarized wave selection method (2 polarized waves×single polarized wave).

Figure 6:
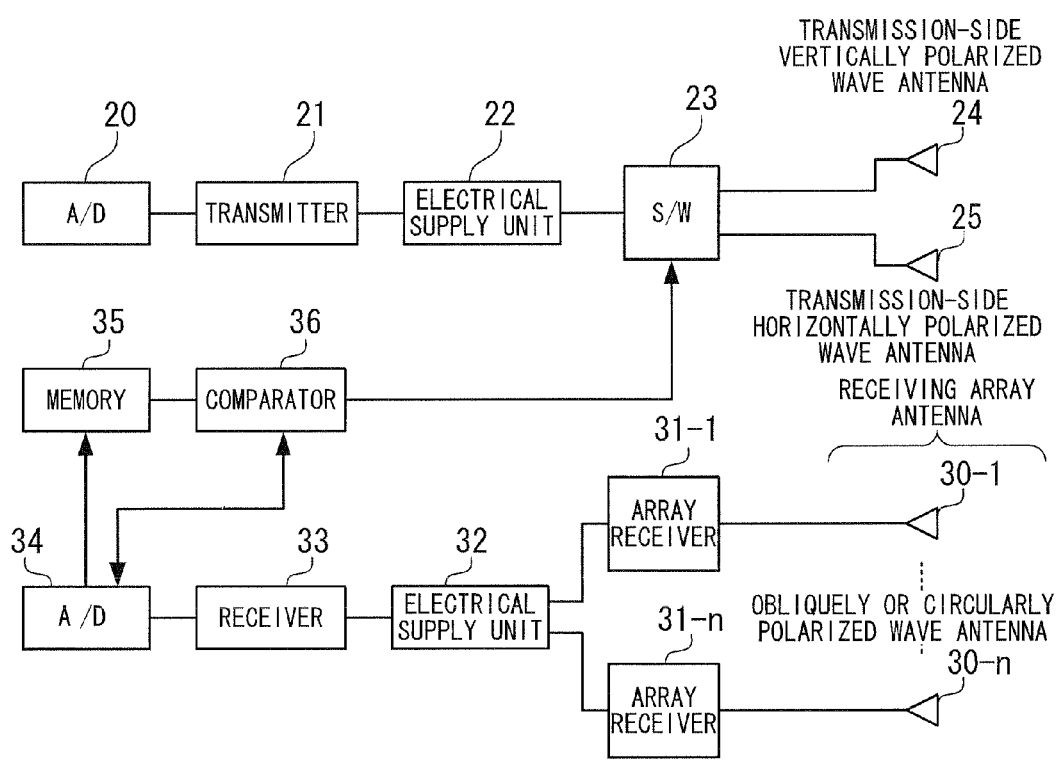
FIG. 6 is a block diagram illustrating a configuration of an onboard radar using a polarized-wave selection method in accordance with a first preferred embodiment of the present invention.

FIG. 6 is a block diagram illustrating a configuration of the onboard radar using the polarized wave selection method in accordance with the first preferred embodiment. In FIG. 6, an A/D 20 converts an analog transmission signal into a digital transmission signal, and supplies the digital transmission signal to a transmitter 21. The transmitter 21 modulates the digital transmission signal to generate a high frequency signal, and supplies the high frequency signal to an electrical supply unit 22. The electrical supply unit 22 supplies the high frequency signal to a switch circuit 23. The switch circuit 23 alternately switches a transmission-side vertically polarized wave antenna 24 and a transmission-side horizontally polarized wave antenna 25 in accordance with an instruction (control signal) from a comparator 36 to be described later to launch the high frequency signal from any one of the transmission-side vertically polarized wave antenna 24 and the transmission-side horizontally polarized wave antenna 25.

A transmitting antenna (Tx) is formed of the transmission-side vertically polarized wave antenna 24 and the transmission-side horizontally polarized wave antenna 25. The transmission-side vertically polarized wave antenna 24 launches the high frequency signal as a vertically polarized wave, and the transmission-side horizontally polarized wave antenna 25 launches the high frequency signal as a horizontally polarized wave.

A receiving array antenna (Rx) is formed of obliquely polarized wave antennas or circularly (elliptically) polarized wave antennas (hereinafter, referred to as obliquely or circularly polarized wave antennas) 30-1 to 30-n. The reason for using the plurality of antenna elements (array antenna) is to detect orientation or the like of an object, and it is possible to obtain the object, operation, and effect of the present invention even when only one antenna element is provided.

The reason for using the obliquely or circularly polarized wave antennas 30-1 to 30-$n$ is because both of the reflected vertically polarized wave signal and horizontally polarized wave signal can be received by the antenna elements. Accordingly, any one of the transmission side and the receiving side becomes an antenna device for a single polarized wave. For this reason, it is possible to save space. It is possible to make a simpler configuration than the configuration of having the antennas for respective polarized waves. From the viewpoint of power efficiency, the receiving power is decreased to $1/\sqrt{2}$ or lower than the case of providing the antennas for respective polarized waves.

Array receivers 31-1 to 31-$n$ receive the reflection wave (vertically polarized wave or horizontally polarized wave) received by the obliquely or circularly polarized wave antennas 30-1 to 30-$n$, and supply the reflection wave to an electrical supply unit 32. In the first preferred embodiment, at a certain time, the high frequency signal is launched from any one of the transmission-side vertically polarized wave antenna 24 and the transmission-side horizontally polarized wave antenna 25 of the transmitting antenna (Tx). Accordingly, the obliquely or circularly polarized wave antennas 30-1 to 30-$n$ receive only one of the vertically polarized wave or the horizontally polarized wave at a certain time.

The electrical supply unit 32 supplies the received reflection wave (vertically polarized wave or horizontally polarized wave) to a receiver 33. The receiver 33 converts the received reflection wave (vertically polarized wave or horizontally polarized wave) into an intermediate frequency signal, and supplies the intermediate frequency signal to an A/D 34. The A/D 34 converts the intermediate frequency signal into a digital signal. A memory 35 stores the received reflection wave (vertically polarized wave or horizontally polarized wave), that is, a reception signal. More specifically, the memory 35 stores the reception signal (at least a receiving level) of the reflection wave employed as the reception signal. A comparator 36 compares the previously employed reception signal stored in the memory 35 with a reception signal of the reflection wave received after switching the transmitting antenna, instructs the A/D 34 to employ a reception signal of the polarized wave (vertically polarized wave or horizontally polarized wave) corresponding to the reflection wave with a high receiving level, and instructs the switch circuit 23 to switch the transmitting antenna.

Next, an operation of the first preferred embodiment (polarized wave selection method (2 polarized waves×single polarized wave) will be described.

Figure 7:
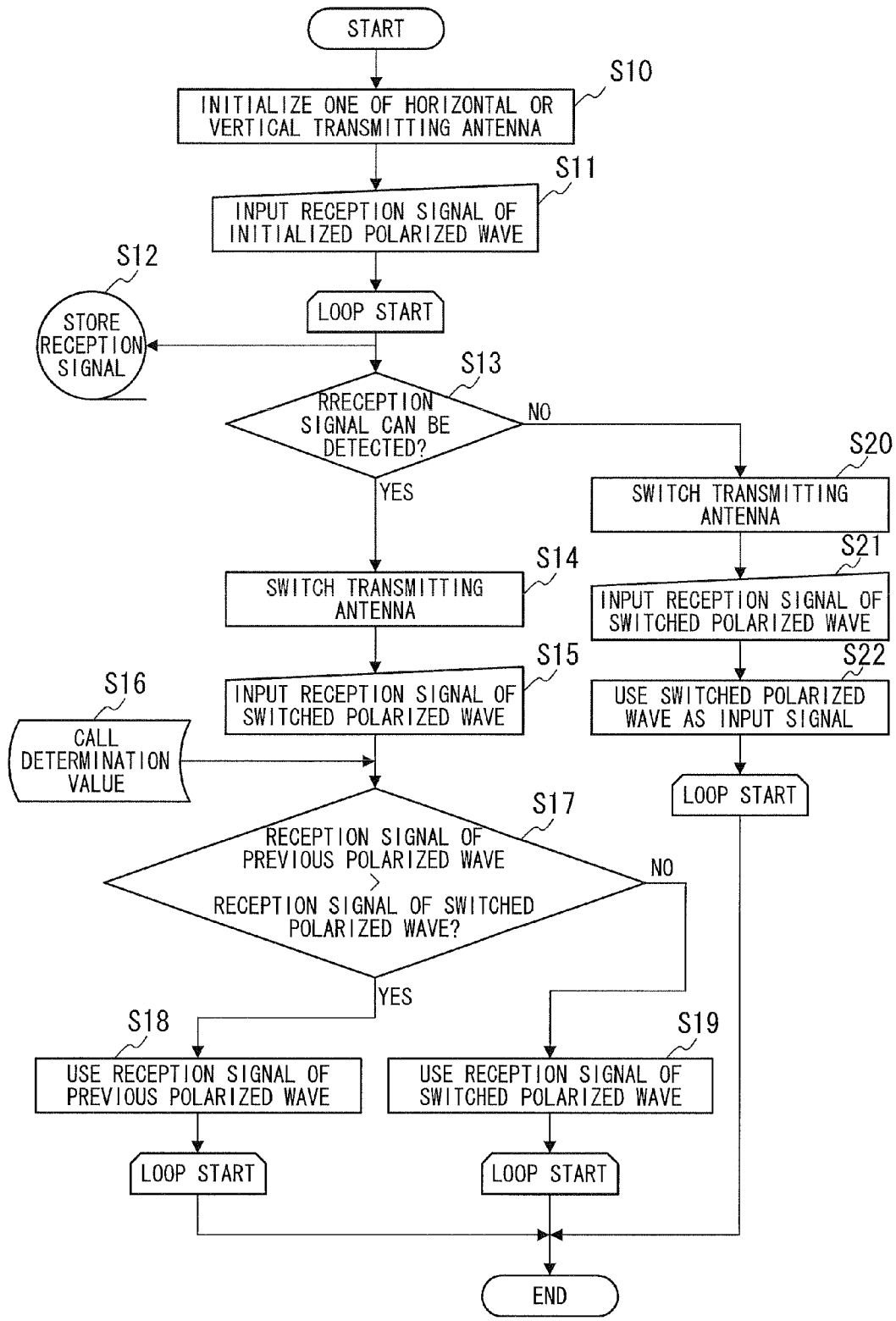
FIG. 7 is a flowchart illustrating an operation of an onboard radar (polarized-wave selection method (2 polarized waves× single polarized wave)) in accordance with the first preferred embodiment.

FIG. 7 is a flowchart illustrating the operation of the onboard radar (polarized wave selection method (2 polarized waves×single polarized wave)) in accordance with the first preferred embodiment. First, any one of the transmission-side vertically polarized wave antenna 24 and the transmission-side horizontally polarized antenna 25 are selected and initialized (Step S10). For example, the transmission-side vertically polarized wave antenna 24 is selected. A vertically polarized high frequency signal is launched from the transmission-side vertically polarized wave antenna 24. Then, a reflection wave of the polarized wave (in this case, the vertically polarized wave) transmitted from the initialized transmitting antenna is received by the obliquely or circularly polarized wave antennas 30-1 to 30-$n$, the reception signal is input (Step S11) and stored in the memory 35 (Step S12).

Then, it is determined by the comparator 36 whether or not the reception signal can be detected, that is, the receiving intensity is equal to or higher than the minimum detection precision (Step S13). When the reception signal can be detected, the switch circuit 23 is controlled to switch the transmitting antenna (Step S14). In this case, since the transmission-side vertically polarized wave antenna 24 is selected by the initialization, the transmitting antenna is switched into the transmission-side horizontally polarized wave antenna 25. A horizontally polarized high frequency signal is launched from the switched transmission-side horizontally polarized wave antenna 25.

Then, the reflection wave of the polarized wave (in this case, the vertically polarized wave) transmitted from the transmitting antenna is received by the obliquely or circularly polarized wave antennas 30-1 to 30-$n$, and the reception signal is input (Step S15). Then, the previously employed reception signal is called as a determination value from the memory 35 (Step S16), it is determined by the comparator 36 whether or not the reception signal of the previously employed polarized wave (vertically polarized wave) is larger than the reception signal of the polarized wave (horizontally polarized wave) of the reflection wave received immediately after the switching (Step S17). When the reception signal of the previously employed polarized wave (vertically polarized wave) is larger than the reception signal of the polarized wave (horizontally polarized wave) immediately after the switching, the reception signal of the previously employed polarized wave is employed as a reflection wave reflected from the object (Step S18).

Meanwhile, when the reception signal of the previously employed polarized wave (vertically polarized wave) is not larger than the reception signal of the polarized wave (horizontally polarized wave) received immediately after the switching, the reception signal of the polarized wave (horizontally polarized wave) received immediately after the switching is employed as a reflection wave reflected from the object (Step S19).

In any case, thereafter, returning to Step S12, while the reception signal can be detected, the transmission-side vertically polarized wave antenna 24 and the transmission-side horizontally polarized wave antenna 25 are alternately switched, and the operation of selectively employing the reception signal with a high receiving level is repeated.

When the reception signal cannot be detected (Step S13: No), the transmitting antenna is switched by the switch circuit 23 (Step 20), the reflection wave of the polarized wave transmitted from the transmitting antenna is received by the obliquely or circularly polarized wave antennas 30-1 to 30-$n$, and the reception signal is input (Step S21). Then, the reception signal of the switched polarized wave is employed as a reflection wave reflected from the object (Step S22).

For example, when the previous polarized wave is a vertically polarized wave, that is, when the transmitting antenna can be switched into the transmission-side vertically polarized wave antenna 24 and the reception signal cannot be detected, the transmitting antenna is switched into the transmission-side horizontally polarized wave antenna 25 and the reception signal of the horizontally polarized wave is employed. Meanwhile, when the previous polarized wave is a horizontally polarized wave, that is, when the transmitting antenna can be switched into the transmission-side horizontally polarized wave antenna 25 and the reception signal cannot be detected, the transmitting antenna is switched into the transmission-side vertically polarized wave antenna 24 and the reception signal of the vertically polarized wave is employed.

Then, returning to Step S12, when the reception signal can be detected, the operations of Steps S12 to S19 are repeated.

When the reception signal cannot be detected, the operations of Steps S20 to S22 are repeated.

Next, another onboard radar in accordance with the first preferred embodiment of the present invention will be described.

Another onboard radar in accordance with the first preferred embodiment of the present invention is provided with two polarized wave (vertically polarized wave and horizontally polarized wave) transmitting antennas on the transmission side, and is provided with two polarized wave (vertically polarized wave and horizontally polarized wave) receiving antennas on the receiving side. At a certain time, any one of two polarized waves (vertically polarized wave or horizontally polarized wave) are transmitted on the transmission side, and a reflection wave (vertically polarized wave or horizontally polarized wave) corresponding to the transmitted polarized wave is received on the receiving side. In this case, since respective polarized wave receiving antennas are provided, there is no decrease of receiving power caused by the receiving antenna. Hereinafter, this is referred to as a polarized wave selection method (2 polarized waves×2 polarized waves).

Figure 8:
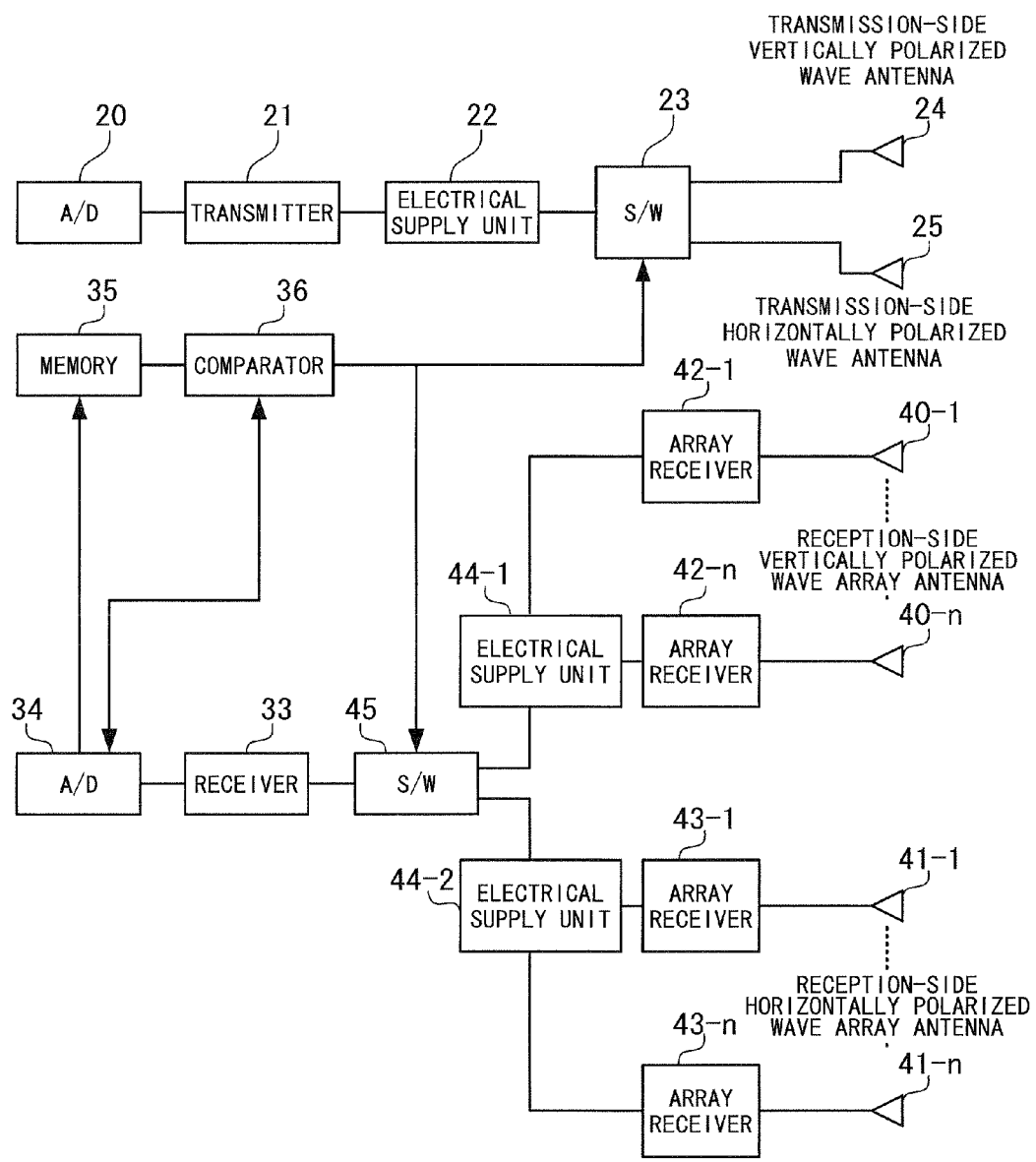
FIG. 8 is a block diagram illustrating a configuration of another onboard radar using a polarized-wave selection method in accordance with the first preferred embodiment.

FIG. 8 is a block diagram illustrating a configuration of another onboard radar using the polarized wave selection method in accordance with the first preferred embodiment. The same reference numerals and signs are given to parts corresponding to FIG. 6, and the description thereof is not repeated. In FIG. 8, a receiving array antenna (Rx) is formed of receiving side vertically polarized wave array antennas 40-1 to 40-*n*, and receiving side horizontally polarized wave array antennas 41-1 to 41-*n*. The reason for using the plurality of antenna elements (array antenna) is to detect the orientation or the like of an object, and it is possible to obtain the object, operation, and effect of the present invention even when only one antenna element for each polarized wave is provided.

The receiving side vertically polarized wave array antennas 40-1 to 40-*n* receive a reflected vertically polarized wave signal, and the receiving side horizontally polarized wave array antennas 41-1 to 41-*n* receive a reflected horizontally polarized wave signal. The switch circuit 45 selectively switches whether to use any array antenna in accordance with an instruction from the comparator 36 by synchronizing with the time of switching the transmission-side vertically polarized wave antenna 24 or the transmission-side horizontally polarized wave antenna 25 by the transmission switch circuit 23. More specifically, when the transmission-side vertically polarized wave antenna 24 is selected, the receiving side vertically polarized wave array antennas 40-1 to 40-*n* are selected. When the transmission-side horizontally polarized wave antenna 25 is selected, the receiving side horizontally polarized wave array antennas 41-1 to 41-*n* are selected.

Array receivers 42-1 to 42-*n* receive the reflection wave (vertically polarized wave) received by the receiving side vertically polarized wave array antennas 40-1 to 40-*n*, and supply the reflection wave to an electric supply unit 44-1. Array receivers 43-1 to 43-*n* receive the reflection wave (horizontally polarized wave) received by the receiving side horizontally polarized wave array antennas 41-1 to 41-*n*, and supply the reflection wave to an electric supply unit 44-2.

The electric supply unit 44-1 supplies the received reflection wave (vertically polarized wave) to a switch circuit 45. The electric supply unit 44-2 supplies the received reflection wave (horizontally polarized wave) to the switch circuit 45. The switch circuit 45 selectively switches the supply unit into any one of the electric supply unit 44-1 and the electric supply unit 44-2 in accordance with the instruction from the comparator 36, and supplies the reflection wave (vertically polarized wave) received by the receiving side vertically polarized wave array antennas 40-1 to 40-*n* or the reflection wave (horizontally polarized wave) received by the receiving side horizontally polarized wave array antennas 41-1 to 41-*n* to a receiver 33.

Next, an operation of another onboard radar in accordance with the first preferred embodiment will be described.

Figure 9:
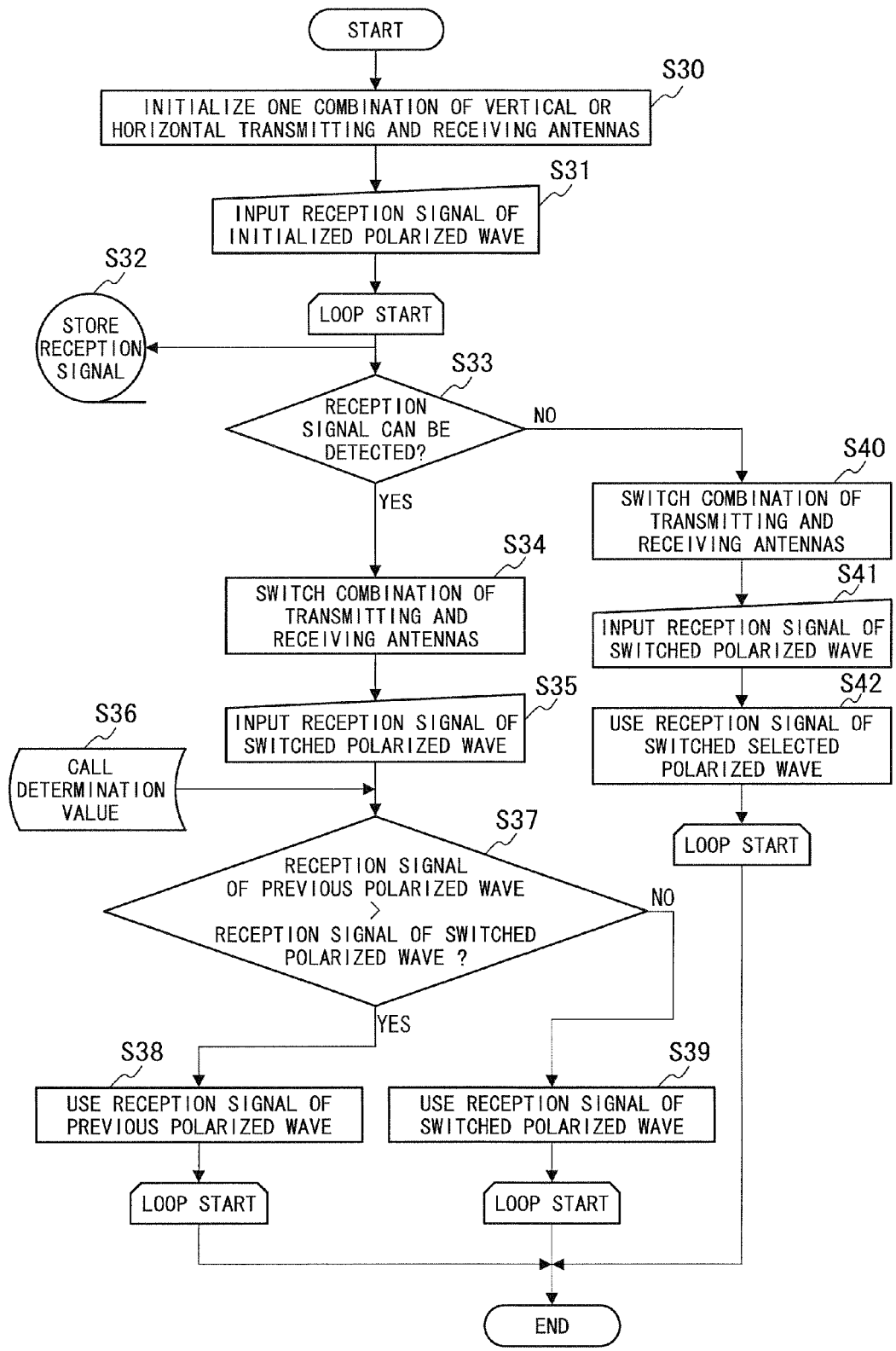
FIG. 9 is a flowchart illustrating an operation of another onboard radar (polarized-wave selection method (2 polarized waves×2 polarized waves)) in accordance with the first preferred embodiment.

FIG. 9 is a flowchart illustrating the operation of another onboard radar (polarized wave selection method (2 polarized waves×2 polarized waves) in accordance with the first preferred embodiment. First, on both transmission side and receiving side, any one combination of the transmission-side vertically polarized wave antenna 24 or the transmission-side vertically polarized wave antenna 25 and receiving side vertically polarized wave array antennas 40-1 to 40-*n* or the receiving side horizontally polarized wave array antenna 41-1 to 41-*n* is selected and initialized (Step S30).

For example, the combination of the transmission-side vertically polarized wave antenna 24 and the receiving side vertically polarized wave array antennas 40-1 to 40-*n*, that is, the vertically polarized wave is selected and initialized. A vertically polarized high frequency signal is launched from the transmission-side vertically polarized wave antenna 24.

Then, the reflection wave of the polarized wave (in this case, the vertically polarized wave) transmitted from the initialized transmitting antenna is received by the similarly initialized receiving side vertically polarized wave array antennas 40-1 to 40-*n*, and the reception signal is input (Step S31) and is stored in the memory 35 (Step S32).

Then, it is determined by the comparator 36 whether or not the reception signal can be detected, that is, the receiving intensity is equal to or higher than the minimum detection precision (Step S33). When the reception signal can be detected, the switch circuits 23 and 45 are controlled to switch the transmission and receiving antennas (Step S34). In this case, since the transmission-side vertically polarized wave antenna 24 and the receiving side vertically polarized wave array antennas 40-1 to 40-*n* are selected, the combination is switched into the combination of the transmission-side horizontally polarized antenna 25 and the receiving side horizontally polarized wave array antennas 41-1 to 41-*n*. A horizontally polarized high frequency signal is launched from the switched transmission-side horizontally polarized wave antenna 25.

Then, the reflection wave of the polarized wave (in this case, the horizontally polarized wave) transmitted from the transmitting antenna is received by the receiving side horizontally polarized wave array antennas 41-1 to 41-*n*, and the reception signal is input (Step S35). Then, the previously employed reception signal, which is called a determination value, is read from the memory 35 (Step S36), it is determined by the comparator 36 whether or not the reception signal of the previously employed polarized wave (vertically polarized wave) is larger than the reception signal of the polarized wave (horizontally polarized wave) of the reflection wave received immediately after the switching (Step S37). When the reception signal of the previously employed polarized wave (vertically polarized wave) is larger than the reception signal of the polarized wave (horizontally polarized wave) immediately after the switching, the reception signal of the previously employed polarized wave is employed as a reflection wave reflected from the object (Step S38).

Meanwhile, when the reception signal of the previously employed polarized wave (vertically polarized wave) is not larger than the reception signal of the polarized wave (horizontally polarized wave) received immediately after the switching, the reception signal of the polarized wave (horizontally polarized wave) received immediately after the switching is employed as a reflection wave reflected from the object (Step S39).

In any case, thereafter, returning to Step S32, while the reception signal can be detected, the combination of the transmission-side vertically polarized wave antenna 24 and the receiving side vertically polarized wave array antennas 40-1 to 40-n and the combination of the transmission-side horizontally polarized wave antenna 25 and the receiving side horizontally polarized wave array antennas 41-1 to 41-n are alternately switched, and the operation of selectively employing the reception signal with a high receiving level is repeated.

When the reception signal cannot be detected (Step S33: No), the combination of the transmission and receiving antennas is switched (Step S40), the reflection wave of the polarized wave transmitted from the switched transmitting antenna is received by the corresponding receiving antenna, and the reception signal is input (Step S41). Then, the reception signal of the switched polarized wave is employed as a reflection wave reflected from the object (Step S42).

For example, when the previous polarized wave is a vertically polarized wave, that is, when the combination can be switched into the combination of the transmission-side vertically polarized wave antenna 24 and the receiving side vertically polarized wave array antennas 40-1 40-n and the reception signal cannot be detected, the combination is switched into the combination of the transmission-side horizontally polarized wave antenna 25 and the receiving side horizontally polarized wave array antennas 41-1 to 41-n and the reception signal of the horizontally polarized wave is employed. Meanwhile, when the previous polarized wave is a horizontally polarized wave, that is, when the combination can be switched into the combination of the transmission-side horizontally polarized wave antenna 25 and the receiving side horizontally polarized wave array antennas 41-1 to 41-n, and the reception signal cannot be detected, the combination is switched into the combination of the transmission-side vertically polarized wave antenna 24 and the receiving side vertically polarized wave array antennas 40-1 to 40-n, and the reception signal of the vertically polarized wave is employed.

Then, returning to Step S32, when the reception signal can be detected, the operations of Steps S32 to S39 are repeated. When the reception signal cannot be detected, the operations of Steps S40 to S42 are repeated.

Figure 10:
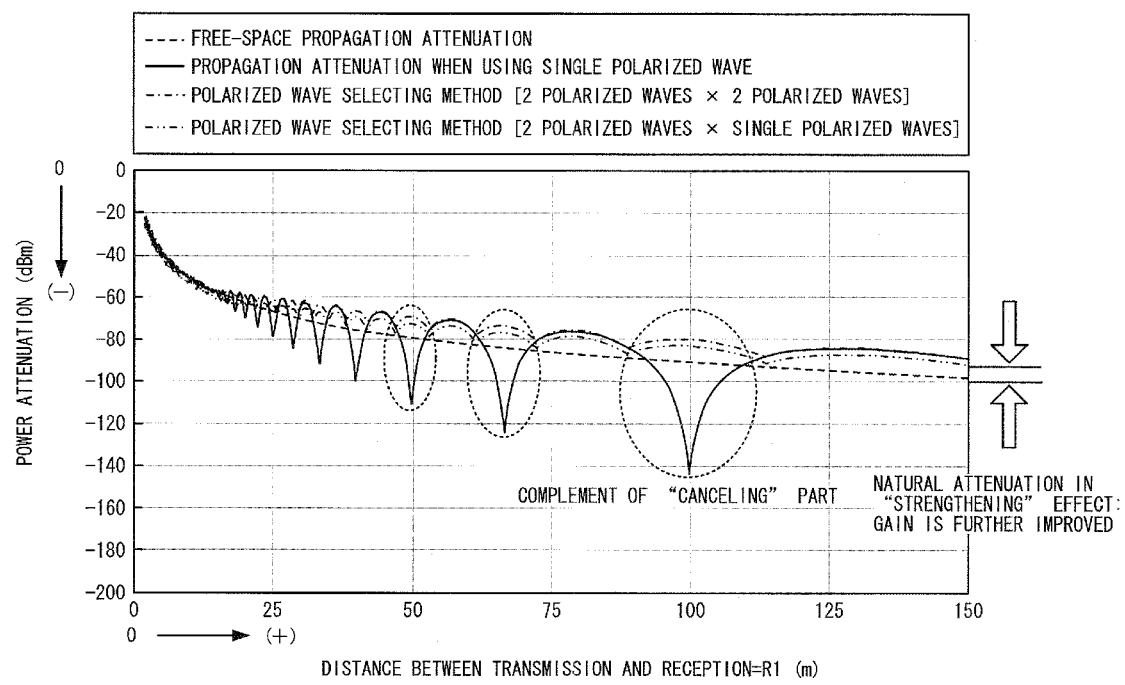
FIG. 10 is a schematic diagram illustrating power attenuation characteristics of the onboard radar in accordance with the first preferred embodiment.

FIG. 10 is a schematic diagram illustrating power attenuation characteristics of the onboard radar in accordance with the first preferred embodiment. The vertical axis denotes power attenuation, and the horizontal axis denotes the distance between transmission and reception R1. The solid line denotes the propagation attenuation characteristics at the time of using a single polarized wave, that is, in the known technique. As described above, in the case of the single polarized wave, the attenuation characteristics fluctuate up and down, the "canceling" parts and the "strengthening" parts like forming ridge portions and valley portions appear along the propagation attenuation characteristics of the free space represented by the broken line.

As for this, in accordance with the first preferred embodiment, in the configuration (polarized wave selection method (2 polarized waves×single polarized wave)) shown in FIG. 6, the attenuation characteristics are as shown by the chain double dashed line. Accordingly, the "canceling" parts (valley portions) surrounded by the oval represented by the dotted lines and having a drastically large attenuation in the single polarized wave are improved, and the gain is improved as compared with the propagation attenuation characteristics of the free space. In the configuration (polarized wave selection method (2 polarized waves×2 polarized waves)) shown in FIG. 8, the attenuation characteristics are as shown by the chain line. Accordingly, the "canceling" parts (valley portions) having a drastically large attenuation in the single polarized wave are improved, and the gain is improved as compared with the propagation attenuation characteristics of the free space. In addition, the gain is improved as compared with the configuration (polarized wave selection method (2 polarized waves×single polarized wave)) shown in FIG. 6. Therefore, in accordance with the first preferred embodiment, the influence caused by road surface multi-path fading is drastically reduced or suppressed, and it is possible to improve the reception sensitivity.

C. Second Preferred Embodiment

A second preferred embodiment of the present invention will be described.

As is described above, the second preferred embodiment is characterized in that the polarized wave synthesis method of receiving the vertically polarized wave (TM) and the horizontally polarized wave (TE) is employed. An onboard radar in accordance with the second preferred embodiment is provided with two polarized waves (a vertically polarized wave and a horizontally polarized wave) transmitting antennas on the transmission side, and is provided with a receiving antenna capable of receiving both polarized waves (vertically polarized wave and horizontally polarized wave) on the receiving side. The onboard radar simultaneously transmits two polarized waves (vertically polarized wave or horizontally polarized wave) on the transmission side, and receives two polarized wave (vertically polarized wave and horizontally polarized wave) on the receiving side. Hereinafter, this is referred to as a polarized wave synthesis method (2 polarized waves×single polarized wave).

Figure 11:
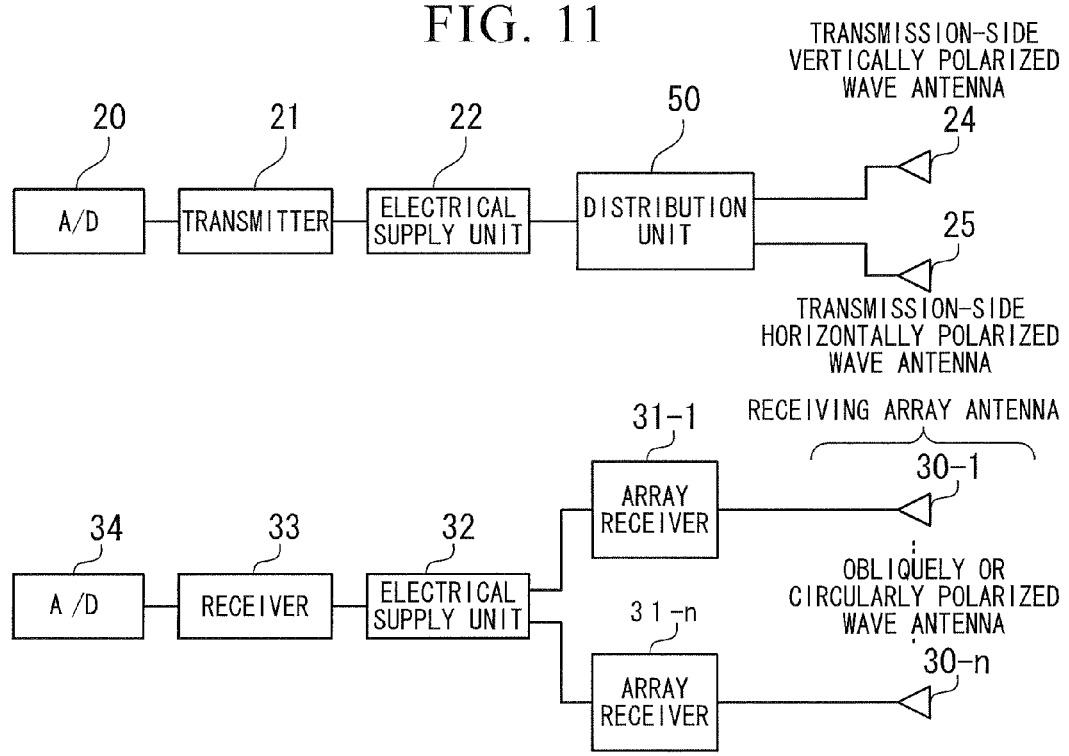
FIG. 11 is a block diagram illustrating a configuration of an onboard radar using a polarized-wave selection method in accordance with a second preferred embodiment of the present invention.

FIG. 11 is a block diagram illustrating a configuration of the onboard radar using the polarized wave synthesis method in accordance with the second preferred embodiment of the present invention. The same reference numerals and signs are given to parts corresponding to FIG. 6, and the description thereof is not repeated. In FIG. 11, a distribution unit 50 distributes a high frequency signal supplied from an electric supply unit 22 into a transmission-side vertically polarized wave antenna 24 and a transmission-side horizontally polarized wave antenna 25, and simultaneously launches the distributed signals from both of the transmission-side vertically polarized wave antenna 24 and the transmission-side horizontally polarized wave antenna 25.

In the polarized wave synthesis method (2 polarized waves×single polarized wave), one of the transmission side and the receiving side is provided as a single polarized wave antenna in the same manner as the above-described polarized wave selection method (2 polarized waves×single polarized wave), and thus it is possible to save space and simplify the configuration. However, from the view point of power efficiency, receiving power is decreased by 1/√2 or lower as compared with the case of providing respective polarized wave antennas.

Next, an operation of the onboard radar in accordance with the second preferred embodiment of the present invention will be described.

Figure 12:
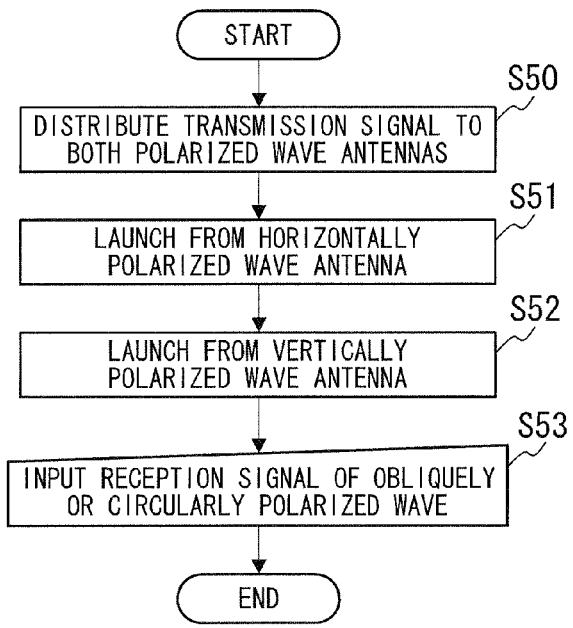
FIG. 12 is a flowchart illustrating an operation of the onboard radar (polarized-wave synthesis method (2 polarized waves×single polarized wave)) in accordance with the second preferred embodiment.

FIG. 12 is a flowchart illustrating the operation of the onboard radar (polarized wave synthesis method (2 polarized waves×single polarized wave)) in accordance with the second preferred embodiment of the present invention. First, on the transmission side, the high frequency signal is distributed by the distribution unit 50 (Step S50), the horizontally polarized high frequency signal is launched from the transmission-side horizontally polarized wave antenna 25 (Step S51), and the vertically polarized high frequency signal is launched from the transmission-side vertically polarized wave antenna 24 (Step S52). On the receiving side, the reception signal of the reflection wave (vertically polarized wave and horizontally polarized wave) received by the obliquely or circularly polarized wave antennas 30-1 to 30-n is input (Step S53). The obliquely or circularly polarized wave antennas 30-1 to 30-n can receive both of the vertically polarized wave and the horizontally polarized wave.

Next, an operation of another onboard radar in accordance with the second preferred embodiment will be described.

Another onboard radar in accordance with the second preferred embodiment is provided with two polarized wave (a vertically polarized wave and a horizontally polarized wave) transmitting antennas on the transmission side, and is provided with two polarized wave (a vertically polarized wave and a horizontally polarized wave) receiving antennas on the receiving side. On the transmission side, both of two polarized waves (a vertically polarized wave and a horizontally polarized wave) are simultaneously transmitted, and both (vertically polarized wave and horizontally polarized wave) of the reflection waves corresponding to the transmitted polarized waves are received and synthesized on the receiving side. In this case, since the respective polarized wave receiving antennas are provided, there is no decrease of receiving power caused by the receiving antenna. Hereinafter, this is referred to as a polarized wave synthesis method 2 polarized waves×2 polarized waves).

Figure 13:
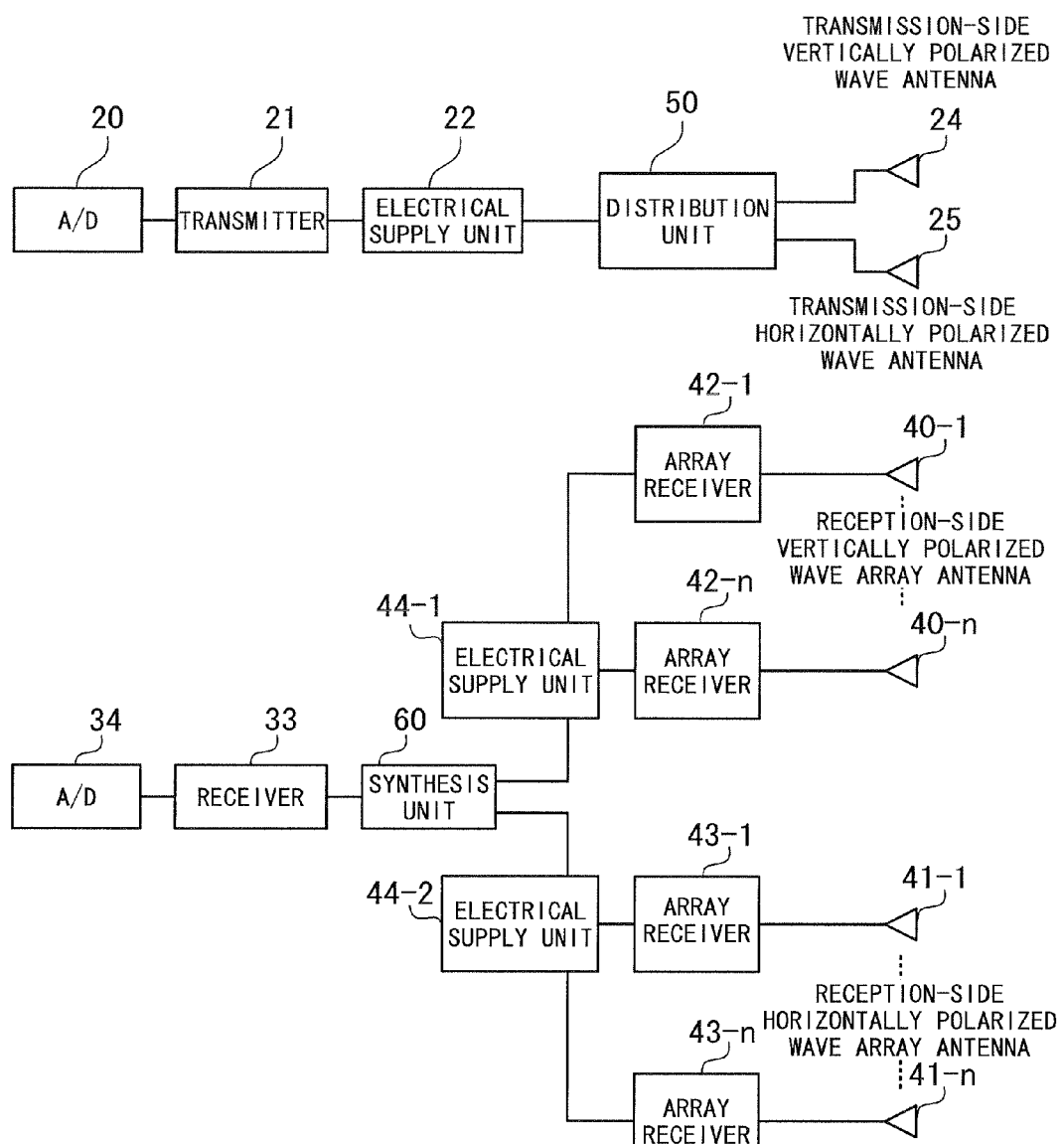
FIG. 13 is a block diagram illustrating a configuration of another onboard radar using a polarized-wave selection method in accordance with the second preferred embodiment.

FIG. 13 is a block diagram illustrating a configuration of another onboard radar using the polarized wave synthesis method in accordance with the second preferred embodiment. The same reference numerals and signs are given to parts corresponding to FIG. 8 or FIG. 11, and the description thereof is not repeated. The reason for using the plurality of antenna elements (array antenna) is to detect orientation or the like of an object, and it is possible to obtain the object, operation, and effect of the present invention even when only one antenna element for each polarized wave is provided. A synthesis unit 60 synthesizes the reception signal (vertically polarized wave) received by the receiving side vertically polarized wave array antennas 40-1 to 40-n and the reception signal (vertically polarized wave) received by the receiving side horizontally polarized wave array antennas 41-1 to 41-n through electric supply units 44-1 and 44-2.

Next, an operation of another onboard radar in accordance with the second preferred embodiment will be described.

Figure 14:
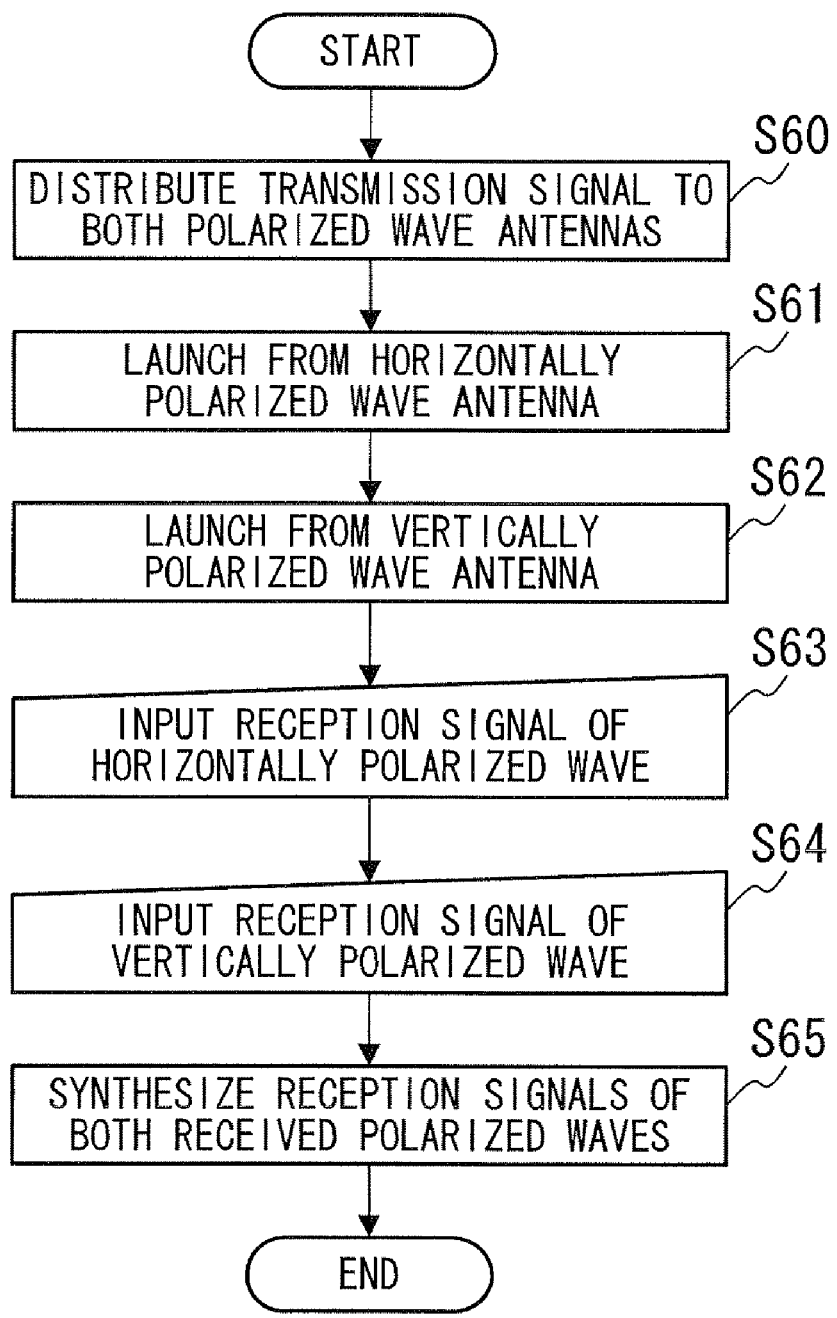
FIG. 14 is a flowchart illustrating an operation of another onboard radar (polarized-wave synthesis method (2 polarized waves×2 polarized waves)) in accordance with the second preferred embodiment.

FIG. 14 is a flowchart illustrating the operation of another onboard radar (polarized wave synthesis method (2 polarized waves×2 polarized waves)) in accordance with the second preferred embodiment. First, on the transmission side, the high frequency signal is distributed by the distribution unit 50 (Step S60), the horizontally polarized high frequency signal is launched from the transmission-side horizontally polarized wave antenna 25 (Step S61), and the vertically polarized high frequency signal is launched from the transmission-side vertically polarized wave antenna 24 (Step S62).

On the receiving side, the reception signal of the reflection wave (horizontally polarized wave) received by the receiving side horizontally polarized wave array antennas 41-1 to 41-n is input (Step S63), the reception signal of the reflection wave (vertically polarized wave) received by the receiving side vertically polarized wave array antennas 40-1 to 40-n is input (Step S64), and the reception signals of both reflection waves (vertically polarized wave and horizontally polarized wave) are synthesized by the synthesis unit 60 (Step S65).

Figure 15:
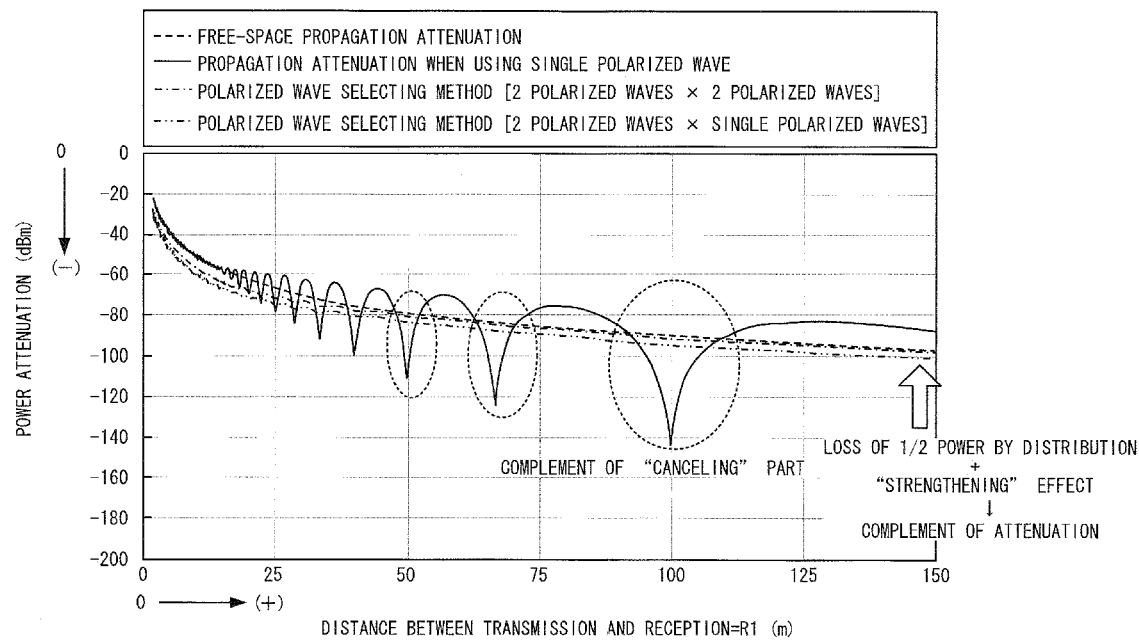
FIG. 15 is a schematic diagram illustrating power attenuation characteristics of the onboard radar in accordance with the second preferred embodiment.

FIG. 15 is a schematic diagram illustrating power attenuation characteristics of the onboard radar in accordance with the second preferred embodiment. The vertical axis denotes power attenuation, and the horizontal axis denotes the distance between transmission and reception R1. The solid line denotes propagation attenuation characteristics at the time of using a single polarized wave, in other words, the known technique. As described above, in the case of the single polarized wave, the attenuation characteristics fluctuate up and down, the "canceling" parts and the "strengthening" parts like forming ridge portions and valley portions appear along the propagation attenuation characteristics of the free space represented by the broken line.

As for this, in accordance with the second preferred embodiment, in the configuration (polarized wave synthesis method (2 polarized waves×single polarized wave)) shown in FIG. 11, there is ½ power loss due to the distribution, the attenuation characteristics are as shown by the chain double dashed line, the gain is slightly low as compared with the propagation attenuation characteristics of the free space. However, the "canceling" parts (valley portions) surrounded by the oval represented by the dotted lines and having a drastically large attenuation in the single polarized wave are improved, and the gain is improved as compared with the propagation attenuation characteristics of the single polarized wave. In the configuration (polarized wave synthesis method (2 polarized waves×2 polarized waves)) shown in FIG. 13, the attenuation characteristics are as shown by the chain line. Accordingly, the gain is slightly lower or substantially equal to that of the propagation attenuation characteristics of the free space in the same manner as the polarized wave synthesis method (2 polarized waves×single polarized wave), and the "canceling" parts (valley portions) having a drastically large attenuation in the single polarized wave are improved. Therefore, the gain is improved as compared with the propagation attenuation characteristics of the single polarized wave, and it is possible to stably obtain the receiving power with respect to the distance as compared with the configuration ((2 polarized waves×single polarized wave)) shown in FIG. 6. As a result, in accordance with the second preferred embodiment, it is possible to suppress the influence caused by road surface multi-path fading to drastically reduce the measurement disturbance caused by the influence.

D. Third Preferred Embodiment

A third preferred embodiment of the present invention will be described.

Figure 16:
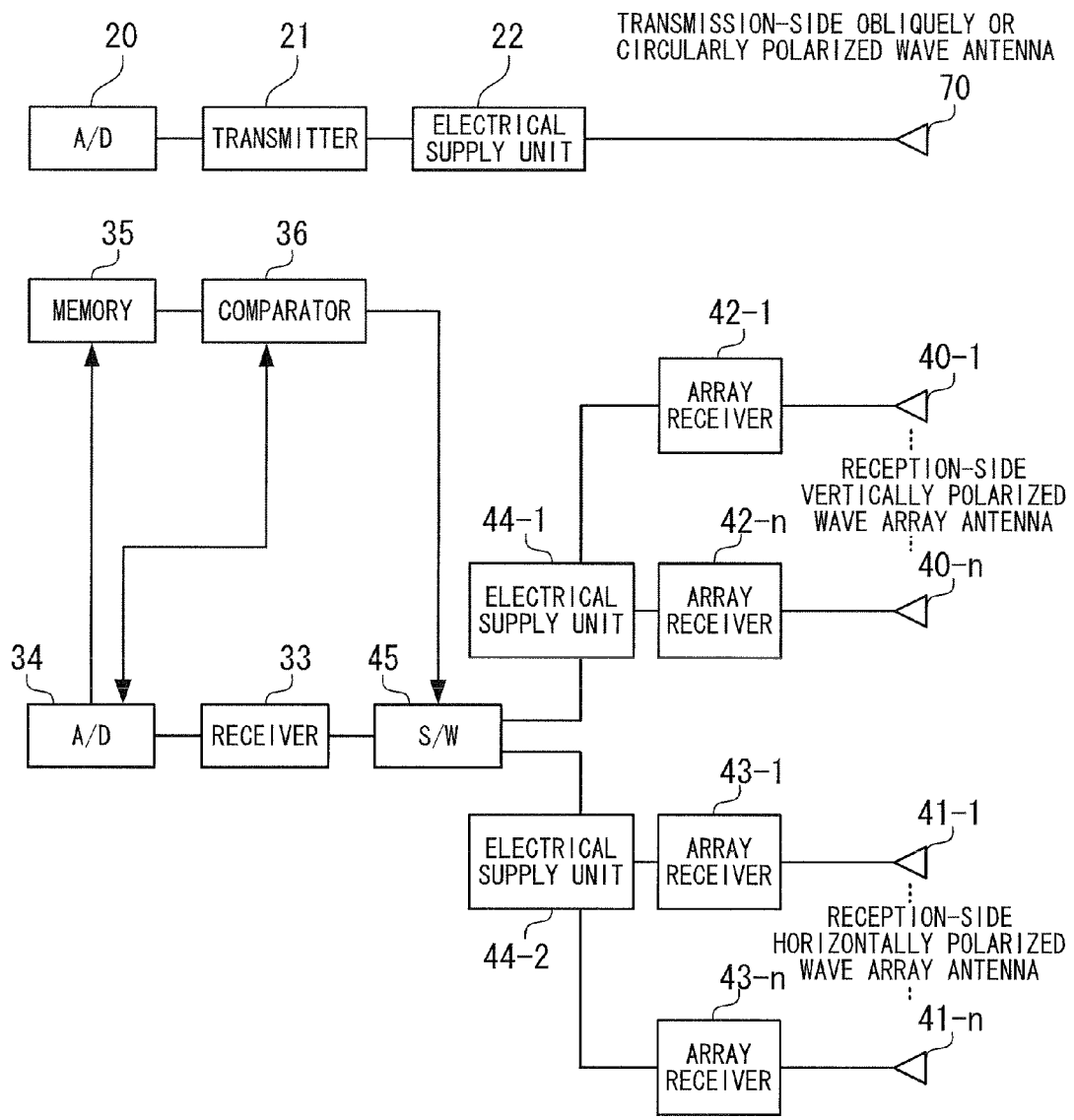
FIG. 16 is a block diagram illustrating a configuration of an onboard radar using a polarized-wave selection method in accordance with a third preferred embodiment of the present invention.

FIG. 16 is a block diagram illustrating a configuration of the onboard radar using the polarized wave selection method in accordance with the third preferred embodiment of the present invention. The same reference numerals and signs are given to parts corresponding to FIG. 6 or FIG. 8, and the description thereof is not repeated. In the third preferred embodiment, using the establishment of "invertibility" of the antenna, the transmitting antenna is formed of an obliquely or circularly polarized wave antenna 70, which is a single polarized wave antenna, capable of transmitting both of the vertically polarized transmission wave and the horizontally polarized transmission wave, and the receiving antenna is formed of vertically polarized wave array antennas 40-1 to 40-n and horizontally polarized wave array antennas 41-1 to 41-n, which are plural polarized wave antennas (2 polarized waves). That is, in the third preferred embodiment, the polarized wave selection method (single polarized wave×2 polarized waves) is employed using the "invertibility" of the antenna.

The transmission-side obliquely or circularly polarized wave antenna 70 transmits only any one of an obliquely polarized wave and a circularly polarized wave. The receiving side vertically polarized wave array antennas 40-1 to 40-n receive a reflected vertically polarized wave signal, and the receiving side horizontally polarized wave array antennas 41-1 to 41-1n receive a reflected horizontally polarized wave signal.

The switch circuit 45 alternately switches whether to use any array antenna in accordance with an instruction from the comparator 36 at a predetermined time. More specifically, the comparator 36 compares the previously employed reception signal stored in the memory 35 with the reception signal of the reflection wave received after the switching the receiving antenna, the comparator 36 instructs the A/D 34 and instructs the switch circuit 45 to switch the receiving antenna, in order to employ (take) the reception signal of the polarized wave (vertically polarized wave or horizontally polarized wave) corresponding to the reflection wave with a high receiving level.

An operation of the third preferred embodiment will be described.

Figure 17:
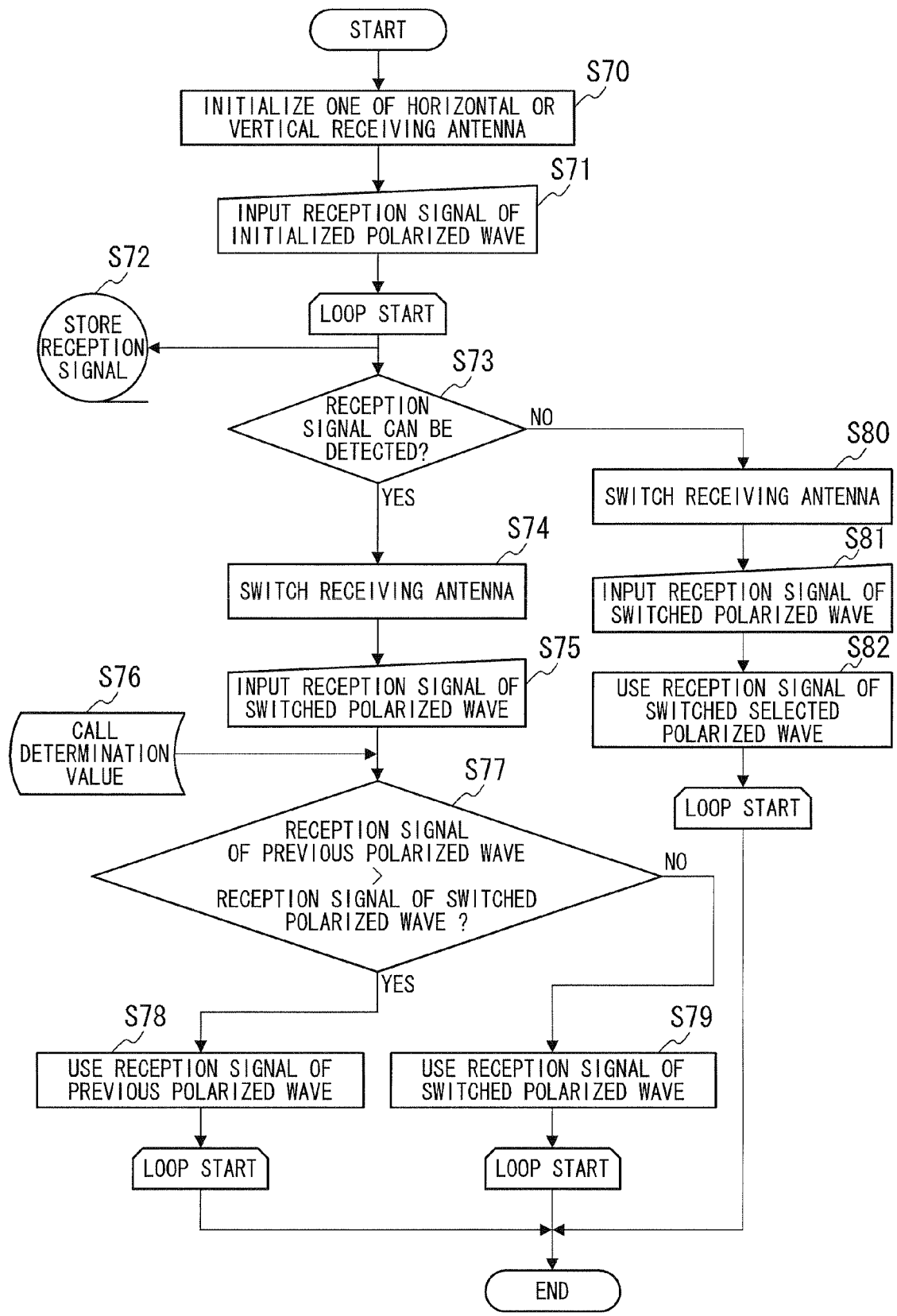
FIG. 17 is a flowchart illustrating an operation of the onboard radar (polarized-wave selection method (single polarized wave×2 polarized waves)) in accordance with the third preferred embodiment.

FIG. 17 is a flowchart illustrating the operation of the onboard radar (polarized wave selection method (single polarized wave×2 polarized waves)) in accordance with the third preferred embodiment. First, any one side of the array antennas of the vertically polarized wave array antennas 40-1 to 40-n and the horizontally polarized wave array antennas 41-1 to 41-n are selected and initialized (Step S70). For example, the vertically polarized wave array antennas 40-1 to 40-n are selected. An obliquely polarized or circularly polarized high frequency signal is launched from the transmission-side obliquely or circularly polarized wave antenna 70. Then, the reflection wave of the polarized signal transmitted from the transmission-side obliquely or circularly polarized wave antenna 70 is received by the initialized receiving antenna (e.g., vertically polarized wave array antennas 40-1 to 40-n), and the reception signal is input (Step S71) and stored in the memory 35 (Step S72).

Then, it is determined by the comparator 36 whether or not the reception signal can be detected, that is, the receiving intensity is equal to or higher than the minimum detection precision (Step S73). When the reception signal can be detected, the switch circuit 45 is controlled to switch the receiving antenna (Step S74). When the vertically polarized wave array antennas 40-1 to 40-n are selected by the initialization, they are switched into the horizontally polarized wave array antennas 41-1 to 41-n. When the horizontally polarized wave array antennas 41-1 to 41-n are selected by the initialization, they are switched into the vertically polarized wave array antenna 40-1 to 40-n.

Then, the reflection wave of the polarized wave signal transmitted from the transmission-side obliquely or circularly polarized wave antenna 70 is received by the switched receiving antenna (e.g., horizontally polarized wave array antennas 41-1 to 41-n), and the reception signal is input (Step S75). Then, the previously employed reception signal is called as a determination value from the memory 35 (Step S76), it is determined by the comparator 36 whether or not the reception signal of the previously employed polarized wave is larger than the reception signal of the polarized wave of the reflection wave received immediately after the switching (Step S77). When the reception signal of the previously employed polarized wave is larger than the reception signal of the polarized wave immediately after the switching, the reception signal of the previously employed polarized wave is employed as a reflection wave reflected from the object (Step S78).

Meanwhile, when the reception signal of the previously employed polarized wave is not larger than the reception signal of the polarized wave received immediately after the switching, the reception signal of the polarized wave received immediately after the switching is employed as a reflection wave reflected from the object (Step S79).

In any case, thereafter, returning to Step S72, while the reception signal can be detected, the receiving side vertically polarized wave array antennas 40-1 to 40-n and the receiving side horizontally polarized wave array antennas 41-1 to 41-n are alternately switched, and the operation of selectively employing the reception signal with a high receiving level is repeated.

When the reception signal cannot be detected (Step S73: No), the receiving antenna is switched by the switch circuit 45 (Step S80), the reflection wave of the polarized wave signal transmitted from the transmission-side obliquely or circularly polarized wave antenna 70 is received by any one switched side of the receiving side vertically polarized wave array antenna 40-1 to 40-n and the receiving side horizontally polarized wave array antenna 41-1 to 41-n, and the reception signal is input (Step S81). Then, the reception signal of the polarized wave received by the switched receiving antenna is employed as a reflection wave reflected from the object (Step S82).

For example, when the previous polarized wave is received by the vertically polarized wave array antennas 40-1 to 40-n and the reception signal cannot be detected, they are switched into the receiving side horizontally polarized wave array antennas 41-1 to 41-n, and the reception signal received by the receiving side horizontally polarized wave array antennas 41-1 to 41-n is employed. Meanwhile, when the previous polarized wave is received by the horizontally polarized wave array antennas 41-1 to 41-n and the reception signal cannot be detected, they are switched into the receiving side vertically polarized wave array antennas 40-1 to 40-n, and the reception signal received by the receiving side horizontally polarized wave array antennas 40-1 to 40-n is employed.

Then, returning to Step S72, when the reception signal can be detected, the operations of Steps S72 to S79 are repeated. When the reception signal cannot be detected, the operations of Steps S80 to S82 are repeated.

As described above, in the third preferred embodiment, the polarized wave selection method (single polarized wave×2 polarized waves) is employed, but it can be considered equivalent to the performance of "selection method→2 polarized waves×single polarized wave (FIG. 6)" of the first preferred embodiment, from the viewpoint of the satisfaction of the invertibility of the antenna.

E. Fourth Preferred Embodiment

Next, a fourth preferred embodiment of the present invention will be described.

Figure 18:
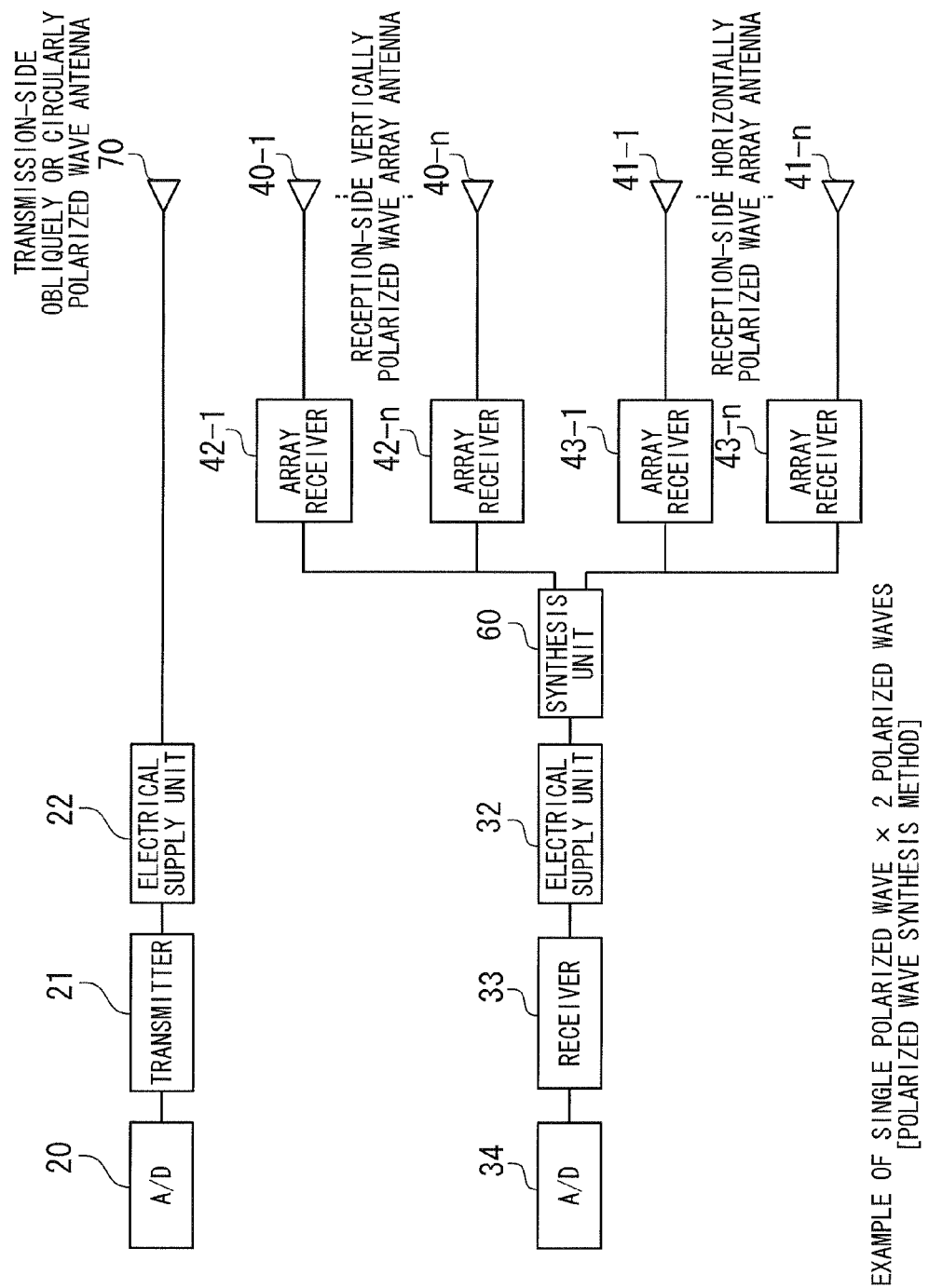
FIG. 18 is a block diagram illustrating a configuration of an onboard radar using a polarized-wave synthesis method in accordance with a fourth preferred embodiment of the present invention.

FIG. 18 is a block diagram illustrating a configuration of an onboard radar using the polarized wave synthesis method in accordance with the fourth preferred embodiment of the present invention. The same reference numerals and signs are given to parts corresponding to FIG. 8, FIG. 11, or FIG. 16, and the description thereof is not repeated. In the fourth preferred embodiment, using the satisfaction of "invertibility" of the antenna in the same manner as the third preferred embodiment, the transmitting antenna is formed of an obliquely or circularly polarized wave antenna 70, which is a single polarized wave antenna, capable of transmitting both of the vertically polarized transmission wave and the horizontally polarized transmission wave, and the receiving antenna is formed of vertically polarized wave array antennas 40-1 to 40-n and horizontally polarized wave array antennas 41-1 to 41-n, which are plural polarized wave antennas (2 polarized waves). The synthesis unit 60 synthesizes the reception signal received by the receiving side vertically polarized wave array antennas 40-1 to 40-n and the reception signal received by the receiving side horizontally polarized wave array antennas 41-1 to 41-n, and then supplies the synthesized signal to the electric supply unit 32 and the units after the electric supply unit 32. That is, in the fourth preferred embodiment, the polarized wave synthesis method (single polarized wave×2 polarized waves) is employed.

Next, an operation of the onboard radar in accordance with the fourth preferred embodiment will be described.

Figure 19:
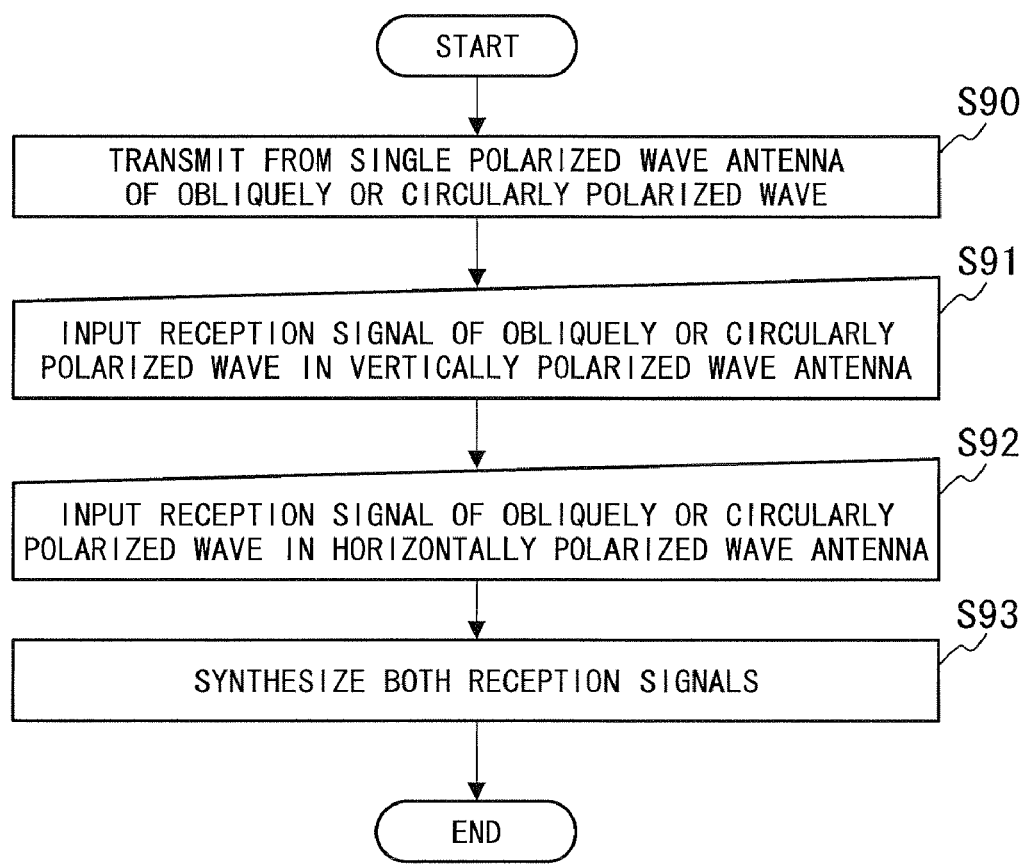
FIG. 19 is a flowchart illustrating an operation of the onboard radar (polarized-wave synthesis method (single polarized wave×2 polarized waves)) in accordance with the fourth preferred embodiment.

FIG. 19 is flowchart illustrating the operation of the onboard radar (polarized wave synthesis method (single polarized wave×2 polarized waves) in accordance with the fourth preferred embodiment. First, on the transmission side, the obliquely or circularly polarized high frequency signal is transmitted from the transmission-side obliquely or circularly polarized wave antenna 70 (Step S90). On the receiving side, the reception signal of the obliquely or circularly polarized reflection wave received by the obliquely or circularly polarized wave antennas 40-1 to 40-n is input (Step S91), and the reception signal of the obliquely or circularly polarized reflection wave received by the horizontally polarized wave array antennas 41-1 to 41-n is input (Step S92). The synthesis unit 60 synthesizes the reception signal of the vertically polarized wave array antennas 40-1 to 40-n and the reception signal of the horizontally polarized wave array antennas 41-1 to 41-n (Step S93).

As described above, in the fourth preferred embodiment, the polarized wave synthesis method (single polarized wave×2 polarized waves) is used, but it can be considered equivalent to the performance of "synthesis method→>2 polarized waves×single polarized waves (FIG. 11)" of the second preferred embodiment, from the viewpoint of satisfaction of the invertibility of the antenna.

The embodiments of the present invention have been described above, but the detailed configurations are not limited to the embodiments, and the present invention includes variations in design within the scope thereof which do not deviate from the concept of the present invention.

For example, in the first to fourth preferred embodiments, the transmitting antenna is formed of the single antenna element and the receiving antenna is formed of the plurality of antenna elements (array antennas), but naturally the present invention is not limited to this configuration.

In the first and second preferred embodiments, instead of the combination of the single antenna element for each polarized wave and the plurality of antenna elements for each polarized wave described in the embodiments, even when the combination of the transmitting antenna and the receiving antenna is any combination of a single antenna element for each polarized wave and a single antenna element for each polarized wave, a plurality of antenna elements for each polarized wave and a single antenna element for each polarized wave, and a plurality of antenna elements for each polarized wave and a plurality of antenna element for each polarized wave, it is possible to obtain the object, operation, and effect of the present invention.

In the third and fourth preferred embodiments, instead of the combination of the single antenna element and the plurality of antenna elements for each polarized wave described in the embodiment, even when the combination of the transmitting antenna and the receiving antenna is any combination of a single antenna element and a single antenna element for each polarized wave, a plurality of antenna elements and a single antenna element for each polarized wave, and a plurality of antenna elements and a plurality of antenna element for each polarized wave, it is possible to obtain the object, operation, and effect of the present invention.

Figure 20:
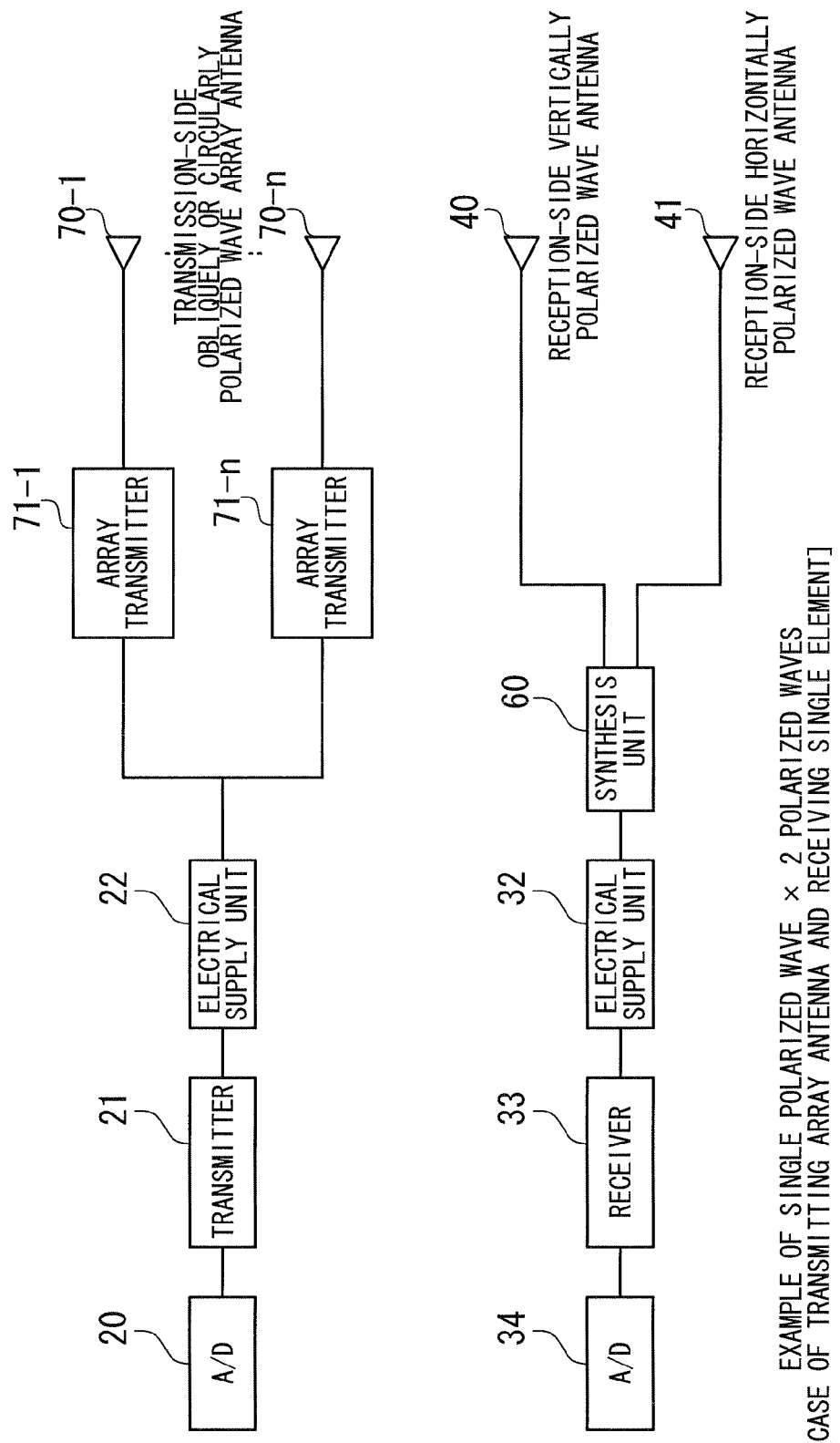
FIG. 20 is a block diagram illustrating another configuration of the onboard radar in accordance with the fourth preferred embodiment.

For example, FIG. 20 is a block diagram illustrating a configuration of an onboard radar in which the transmitting antenna is formed of a plurality of antenna elements (array antennas) and the receiving antenna is formed of a single element of 2 polarized waves, in the polarized wave synthesis method based on the single polarized wave×2 polarized waves in accordance with the fourth preferred embodiment. In FIG. 20, the onboard radar is provided with transmission-side obliquely or circularly polarized wave array antennas 70-1 to 70-n and array transmitters 71-1 to 71-n on the transmission side, and is provided with a receiving side vertically polarized wave antenna 40 and a receiving side horizontally polarized wave antenna 41 on the receiving side, with respect to the configuration shown in FIG. 18.

Figure 21:
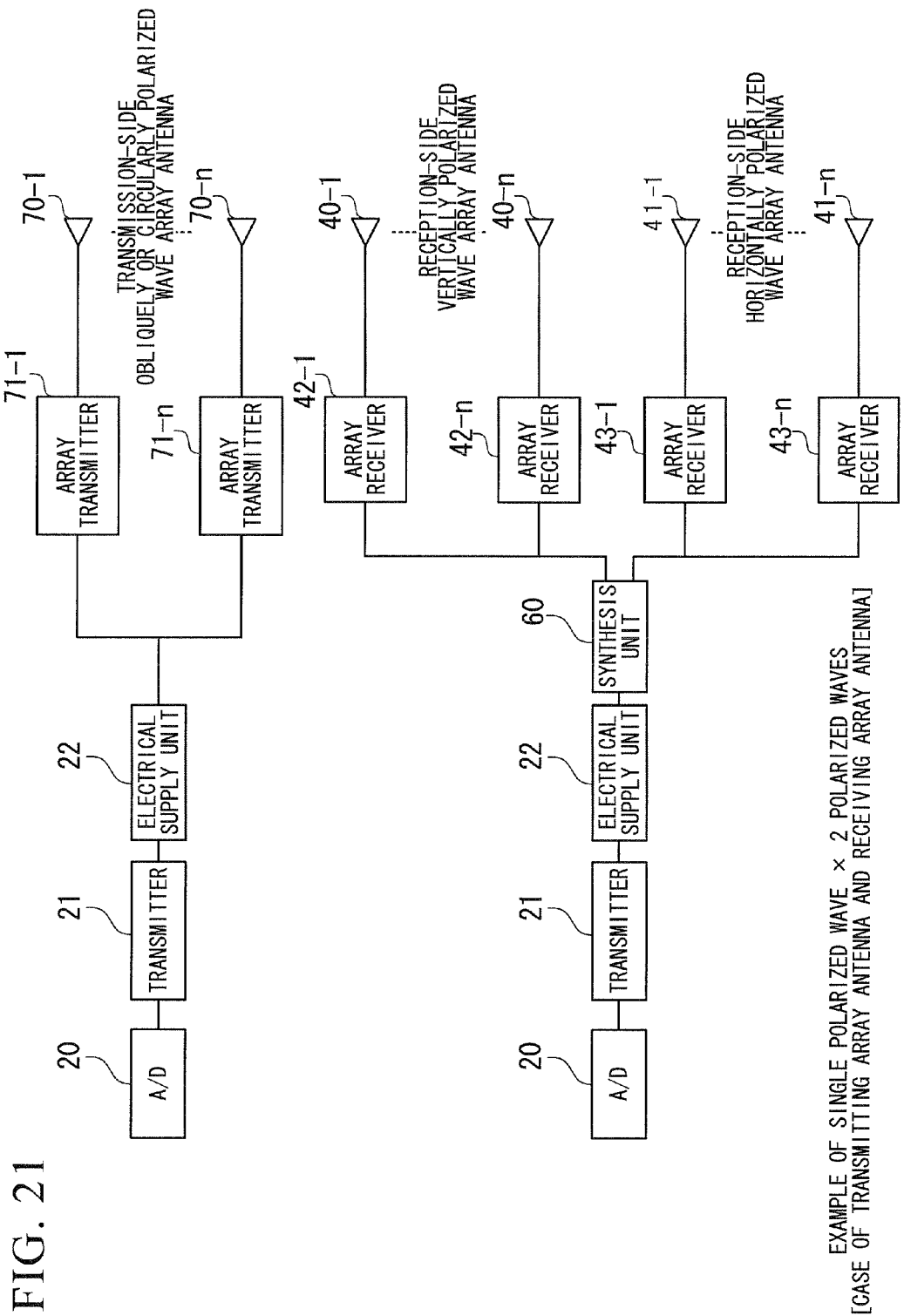
FIG. 21 is a block diagram illustrating still another configuration of the onboard radar in accordance with the fourth preferred embodiment.

FIG. 21 is a block diagram illustrating a configuration of an onboard radar in which the transmitting antenna is formed of a plurality of antenna elements (array antennas) and the receiving antenna is formed of a plurality of antenna elements (array antennas) for each polarized wave in the polarized wave synthesis method based on the single polarized wave×2 polarized waves in accordance with the fourth preferred embodiment. In FIG. 21, the onboard radar is provided with receiving side obliquely or circularly polarized wave array antennas 70-1 to 70-n and array transmitters 71-1 to 71-n on the transmission side, with respect to the configuration shown in FIG. 18. In the same manner as FIG. 18, vertically polarized wave array antennas 40-1 to 40-n and horizontally polarized wave antennas 41-1 to 41-n, which are plural polarized wave antennas (2 polarized waves) are provided on the receiving side.

Of course, even when the combination of the transmitting antenna and the receiving antenna is the single antenna element and the single antenna element for each polarized wave, it is possible to obtain the object, operation, and effect of the present invention.

While preferred embodiments of the present invention have been described and illustrated above, it should be understood that these are exemplary of the present invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

What is claimed is:

1. An onboard radar apparatus comprising:
    a transmission wave generating unit configured to generate a transmission wave;
    a vertically polarized wave transmitting antenna configured to vertically polarize and transmit the transmission wave;
    a horizontally polarized wave transmitting antenna configured to horizontally polarize and transmit the transmission wave;
    a receiving antenna configured to receive a reflection wave reflected from an object;
    a switch control unit configured to perform a switching between the vertically polarized wave transmitting antenna and the horizontally polarized wave transmitting antenna, the switch control unit controlling a supply of the transmission wave, which has been generated by the transmission wave generating unit, to the switched one of the vertically polarized wave transmitting antenna and the horizontally polarized wave transmitting antenna, so as to alternately transmit the transmission wave that is vertically polarized and the transmission wave that is horizontally polarized;

a receiving unit configured to receive one of the reflection wave corresponding to the transmission wave that is vertically polarized and the reflection wave corresponding to the transmission wave that is horizontally polarized as a reception signal, based on receiving levels of the reflection waves, which have been received by the receiving antenna before and after the switching is performed by the switch control unit; and a storage unit configured to store the reception signal, which has been received by the receiving unit, every time the switching between the vertically polarized wave transmitting antenna and the horizontally polarized wave transmitting antenna is performed, and wherein the receiving unit compares the reception signal stored in the storage unit with the reception signal, which has been received by the receiving antenna after the switching between the vertically polarized wave transmitting antenna and the horizontally polarized wave transmitting antenna is performed by the switch control unit, so as to receive the reception signal with a high receiving level.

2. An onboard radar apparatus comprising:

a transmission wave generating unit configured to generate a transmission wave;

a vertically polarized wave transmitting antenna configured to vertically polarize and transmit the transmission wave;

a horizontally polarized wave transmitting antenna configured to horizontally polarize and transmit the transmission wave;

a receiving antenna configured to receive a reflection wave reflected from an object;

a switch control unit configured to perform a switching between the vertically polarized wave transmitting antenna and the horizontally polarized wave transmitting antenna, the switch control unit controlling a supply of the transmission wave, which has been generated by the transmission wave generating unit, to the switched one of the vertically polarized wave transmitting antenna and the horizontally polarized wave transmitting antenna, so as to alternately transmit the transmission wave that is vertically polarized and the transmission wave that is horizontally polarized; and a receiving unit configured to receive one of the reflection wave corresponding to the transmission wave that is vertically polarized and the reflection wave corresponding to the transmission wave that is horizontally polarized as a reception signal, based on receiving levels of the reflection waves, which have been received by the receiving antenna before and after the switching is performed by the switch control unit, when it is not detected that the reflection wave is received by the receiving antenna, the switch control unit performs the switching between the vertically polarized wave transmitting antenna and the horizontally polarized wave transmitting antenna, and the receiving unit receives the reflection wave, which has been received by the receiving antenna after the switching performed by the switch control unit, as the reception signal.

3. The onboard radar apparatus according to claim 1, wherein the receiving antenna receives both a vertically polarized reflection wave reflected from the object and a horizontally polarized reflection wave reflected from the object.

4. The onboard radar apparatus according to claim 3, wherein the receiving antenna is an obliquely polarized wave receiving antenna that receives an obliquely polarized reflection wave reflected from the object.

5. The onboard radar apparatus according to claim 3, wherein the receiving antenna is a circularly polarized wave receiving antenna that receives a circularly polarized reflection wave reflected from the object.

6. The onboard radar apparatus according to claim 1, wherein the receiving antenna comprises:
  a vertically polarized wave receiving antenna configured to receive a vertically polarized reflection wave reflected from the object; and
  a horizontally polarized wave receiving antenna configured to receive a horizontally polarized reflection wave reflected from the object, and the switch control unit performs the switching between the vertically polarized wave receiving antenna and the horizontally polarized wave receiving antenna by synchronizing with the switching between the vertically polarized wave transmitting antenna and the horizontally polarized wave transmitting antenna.

7. An onboard radar apparatus comprising:

a transmission wave generating unit configured to generate a transmission wave;

a transmitting antenna configured to polarize and transmit the transmission wave;

a vertically polarized wave receiving antenna configured to receive a vertically polarized reflection wave reflected from an object;

a horizontally polarized wave receiving antenna configured to receive a horizontally polarized reflection wave reflected from the object;

a switch control unit configured to perform a switching between the vertically polarized wave receiving antenna and the horizontally polarized wave receiving antenna so as to alternately receive the vertically polarized reflection wave reflected from the object and the horizontally polarized reflection wave reflected from the object;

a receiving unit configured to receive one of the vertically polarized reflection wave, which has been received by the vertically polarized wave receiving antenna, and the horizontally polarized reflection wave, which has been received by the horizontally polarized wave receiving antenna, as a reception signal, before and after the switching performed by the switch control unit, based on a receiving level of one of the vertically polarized reflection wave, which has been received by the vertically polarized wave receiving antenna, and the horizontally polarized reflection wave, which has been received by the horizontally polarized wave receiving antenna; and a storage unit configured to store the reception signal, which has been received by the receiving unit, every time the switching between the vertically polarized wave receiving antenna and the horizontally polarized wave receiving antenna is performed, and wherein the receiving unit compares the reception signal stored in the storage unit with the reception signal, which has been received by one of the vertically polarized wave receiving antenna and the horizontally polarized wave receiving antenna after the switching between the vertically polarized wave receiving antenna and the horizontally polarized wave receiving antenna is performed by the switch control unit, so as to receive the reception signal with a high receiving level.

8. An onboard radar apparatus comprising:
a transmission wave generating unit configured to generate a transmission wave;
a transmitting antenna configured to polarize and transmit the transmission wave;
a vertically polarized wave receiving antenna configured to receive a vertically polarized reflection wave reflected from an object;
a horizontally polarized wave receiving antenna configured to receive a horizontally polarized reflection wave reflected from the object;
a switch control unit configured to perform a switching between the vertically polarized wave receiving antenna and the horizontally polarized wave receiving antenna so as to alternately receive the vertically polarized reflection wave reflected from the object and the horizontally polarized reflection wave reflected from the object; and
a receiving unit configured to receive one of the vertically polarized reflection wave, which has been received by the vertically polarized wave receiving antenna, and the horizontally polarized reflection wave, which has been received by the horizontally polarized wave receiving antenna, as a reception signal, before and after the switching performed by the switch control unit, based on a receiving level of one of the vertically polarized reflection wave, which has been received by the vertically polarized wave receiving antenna, and the horizontally polarized reflection wave, which has been received by the horizontally polarized wave receiving antenna, wherein
when it is not detected that the reflection wave is received by at least one of the vertically polarized wave receiving antenna and the horizontally polarized wave receiving antenna, the switch control unit performs the switching between the vertically polarized wave receiving antenna and the horizontally polarized wave receiving antenna, and
the receiving unit receives one of the vertically polarized reflection wave, which has been received by the vertically polarized wave receiving antenna, and the horizontally polarized reflection wave, which has been received by the horizontally polarized wave receiving antenna, as the reception signal after the switching is performed by the switch control unit.

9. The onboard radar apparatus according to claim 7, wherein the transmitting antenna transmits both the transmission wave that is vertically polarized and the transmission wave that is horizontally polarized.

10. The onboard radar apparatus according to claim 9, wherein the transmitting antenna is an obliquely polarized wave transmitting antenna that obliquely polarizes and transmits the transmission wave.

11. The onboard radar apparatus according to claim 9, wherein the transmitting antenna is a circularly polarized wave transmitting antenna that circularly polarizes and transmits the transmission wave.

12. The onboard radar apparatus according to claim 2, wherein the receiving antenna receives both a vertically polarized reflection wave reflected from the object and a horizontally polarized reflection wave reflected from the object.

13. The onboard radar apparatus according to claim 12, wherein the receiving antenna is an obliquely polarized wave receiving antenna that receives an obliquely polarized reflection wave reflected from the object.

14. The onboard radar apparatus according to claim 12, wherein the receiving antenna is a circularly polarized wave receiving antenna that receives a circularly polarized reflection wave reflected from the object.

15. The onboard radar apparatus according to claim 2, wherein
the receiving antenna comprises:
a vertically polarized wave receiving antenna configured to receive a vertically polarized reflection wave reflected from the object; and
a horizontally polarized wave receiving antenna configured to receive a horizontally polarized reflection wave reflected from the object, and
the switch control unit performs the switching between the vertically polarized wave receiving antenna and the horizontally polarized wave receiving antenna by synchronizing with the switching between the vertically polarized wave transmitting antenna and the horizontally polarized wave transmitting antenna.

16. The onboard radar apparatus according to claim 8, wherein the transmitting antenna transmits both the transmission wave that is vertically polarized and the transmission wave that is horizontally polarized.

17. The onboard radar apparatus according to claim 16, wherein the transmitting antenna is an obliquely polarized wave transmitting antenna that obliquely polarizes and transmits the transmission wave.

18. The onboard radar apparatus according to claim 16, wherein the transmitting antenna is a circularly polarized wave transmitting antenna that circularly polarizes and transmits the transmission wave.

* * * * *